United States Patent
Thompson et al.

(10) Patent No.: US 12,450,403 B2
(45) Date of Patent: Oct. 21, 2025

(54) METHOD AND TOOL FOR MODELING CHANGES IN SOLID MATERIALS CAUSED BY GALVANIC OR CHEMICAL INTERACTIONS

(71) Applicant: The Boeing Company, Chicago, IL (US)

(72) Inventors: Richard J. Thompson, Huntsville, AL (US); Kristen S. Williams, Madison, AL (US)

(73) Assignee: The Boeing Company, Arlington, VA (US)

( * ) Notice: Subject to any disclaimer, the term of this patent is extended or adjusted under 35 U.S.C. 154(b) by 1087 days.

(21) Appl. No.: 17/462,928

(22) Filed: Aug. 31, 2021

(65) Prior Publication Data

US 2022/0164494 A1     May 26, 2022

Related U.S. Application Data

(60) Provisional application No. 63/116,390, filed on Nov. 20, 2020.

(51) Int. Cl.
| | |
|---|---|
| *G06F 30/15* | (2020.01) |
| *G01N 17/00* | (2006.01) |
| *G06F 30/20* | (2020.01) |

(52) U.S. Cl.
CPC ............ *G06F 30/15* (2020.01); *G01N 17/006* (2013.01); *G06F 30/20* (2020.01)

(58) Field of Classification Search
CPC ........ G06F 30/15; G06F 30/20; G01N 17/006
See application file for complete search history.

(56) References Cited

U.S. PATENT DOCUMENTS

| | | |
|---|---|---|
| 5,583,426 A | 12/1996 | Tiefnig |
| 5,854,557 A | 12/1998 | Tiefnig |
| (Continued) | | |

FOREIGN PATENT DOCUMENTS

| | | |
|---|---|---|
| CN | 112730205 A | 4/2021 |
| CN | 113588528 A | 11/2021 |
| (Continued) | | |

OTHER PUBLICATIONS

Kristen S. Williams et al.; "Galvanic corrosion risk mapping using coupled empirical and multiphysics corrosion models"; Conference Paper · Aug. 2017 (Year: 2017).*

(Continued)

*Primary Examiner* — Rehana Perveen
*Assistant Examiner* — Nupur Debnath
(74) *Attorney, Agent, or Firm* — Alleman Hall & Tuttle LLP

(57) ABSTRACT

A method including receiving environmental data, sensor data, and a multi-state model are received for an object. The object includes a first material and a second material that galvanically or chemically interacts with the first material. Each of distinct galvanic or chemical state of the object represents a corresponding different equation applicable to a corresponding specific galvanic or chemical interaction between the first and second materials. A stochastic optimization operation is performed on the multi-state model until convergence on candidate sets of galvanic or chemical material change rates for the distinct galvanic or chemical states of the object. A correlation model is generated for a surrogate parameter for the second physical parameters by correlating the environmental data to the sensor data using the candidate sets of galvanic or chemical material change rates. An aircraft design is generated using the correlation model.

25 Claims, 15 Drawing Sheets

(56) References Cited

U.S. PATENT DOCUMENTS

| | | |
|---|---|---|
| 7,345,877 B2 | 3/2008 | Asfia et al. |
| 10,380,278 B2 | 8/2019 | Thompson et al. |
| 10,937,006 B2 | 3/2021 | Engelbart et al. |
| 2008/0234994 A1 | 9/2008 | Goebel et al. |
| 2009/0058427 A1 | 3/2009 | Materer et al. |
| 2011/0060568 A1 | 3/2011 | Goldfine et al. |
| 2012/0074968 A1 | 3/2012 | Chu et al. |
| 2013/0304438 A1 | 11/2013 | Bailey et al. |
| 2014/0278148 A1 | 9/2014 | Ziegel et al. |
| 2015/0268152 A1 | 9/2015 | Friedersdorf et al. |
| 2017/0136757 A1* | 5/2017 | Georgeson .......... B29C 66/7394 |
| 2017/0205333 A1* | 7/2017 | Friedersdorf .......... G01N 17/04 |
| 2019/0049987 A1 | 2/2019 | Djuric et al. |
| 2020/0012871 A1 | 1/2020 | Lee et al. |
| 2020/0272704 A1 | 8/2020 | Laverty et al. |
| 2021/0056365 A1 | 2/2021 | Sivan et al. |
| 2021/0063336 A1 | 3/2021 | Ghods et al. |
| 2021/0072144 A1 | 3/2021 | Omoda et al. |
| 2021/0388579 A1 | 12/2021 | Kennedy |
| 2022/0164494 A1 | 5/2022 | Thompson et al. |
| 2022/0164681 A1 | 5/2022 | Aurongzeb et al. |

FOREIGN PATENT DOCUMENTS

| | | |
|---|---|---|
| CN | 113591385 A | 11/2021 |
| FR | 2917520 A1 | 12/2008 |
| JP | 2004252781 A | 9/2004 |
| WO | 2020162098 A1 | 8/2020 |
| WO | 2021181369 A1 | 9/2021 |

OTHER PUBLICATIONS

Swarnavo Sarkar et al.; "Stochastic reduced order models for uncertainty quantification of intergranular corrosion rates"; Corrosion Science 80 (2014) 257-268 (Year: 2014).*

Gino Rinaldi et al.; "Corrosion Sensor Development for Condition-Based Maintenance of Aircraft"; International Journal of Aerospace Engineering; vol. 2012, Article ID 684024, 11 pages (Year: 2012).*

Siva Palani et al.; "Modeling galvanic corrosion behavior of carbon fiber composite/Al 7050 joints under extended exposures"; 2017 Department of Defense—Allied Nations Technical Corrosion Conference (Year: 2017).*

Yupeng Diao et al.; "Improvement of the machine learning-based corrosion rate prediction model through the optimization of input features"; (Year: 2020).*

E. Rocca et al.; "Long term corrosion of aluminium materials of heritage: analysis and diagnosis of aeronautic collection"; Corrosion Engineering, Science and Technology 2010 vol. 45 (Year: 2010).*

Macha, E. N., et al., "Development of a Methodology to Predict Atmospheric Corrosion Severity using Corrosion Sensor Technologies", NACE International, Corrosion Conference and Expo 2019, Mar. 24-28, 2019, 14 pages.

Boswell-Koller, C. N., et al., "Statistical Analysis of Enviromental Parameters: Correlations between Time of Wetness and Corrosion Severity", Corrosionjournal.org, May 1, 2019, 7 pages.

Adey, R., et al., "Predicting Cumulative Galvanic Corrosion Damage in Aircraft Structures using Enviromental Exposure Measurements", Jan. 1, 2019, 13 pages.

Bellinger, N.C.. et al., "Corrosion Pillowing Stresses in Fuselage Lap Joints," AIAA Journal, vol. 35, No. 2, Feb. 1997, 4 pages.

Liao, M. et al., "Corrosion Risk Assessment of Aircraft Structures," Journal of ASTM International, vol. 1, No. 8, Sep. 2004, 11 pages.

Cole, I.S. et al., "Development of a Sensor-Based Learning Approach to Prognostics in Intelligent Vehicle Health Monitoring," Proceedings of the 2008 International Conference on Prognostics and Health Management, Oct. 6, 2008, Denver, CO, 7 pages.

Hickman, G.A. et al., "Application of Smart Structures to Aircraft Health Monitoring," Proceedings of the First Joint U.S./Japan Conference on Adaptive Structures, Nov. 13, 1990, Maui, HI, 20 pages.

Komorowski, J.P. et al., "Research in corrosion of ageing transport aircraft structures at SMPL," CASI Journal : IAR 50th Anniversary Edition, vol. 47, No. 3, Sep. 2001, 24 pages.

Boyer, R.R., "New Titanium Applications on the Boeing 777 Airplane," JOM, vol. 44, May 1992, 3 pages.

Froes, F.H., "Titanium—Physical Metallurgy Processing and Applications," ASM International, Jan. 1, 2015, 11 pages.

"FAA Foreign Object Debris Program," Federal Aviation Administration, Available Online at https://www.faa.gov/airports/airport/safety/fod/, Last Modified Sep. 3, 2020, 1 pages.

Moran, R.L., "What is FOD?" U.S. Army Risk Management Magazine, Available Online at https://safety.army.mil/MEDIA/Risk-Management-Magazine/ArtMID/7428/ArticleID/6199/What-is-FOD, Jan. 20, 2019, 4 pages.

European Patent Office, Extended European Search Report Issued in Application No. 23188055.0, Jan. 3, 2024, 9 pages.

United States Patent and Trademark Office, Office Action Issued in U.S. Appl. No. 17/943,632, filed Dec. 24, 2024, 34 pages.

European Patent Office, Extended European Search Report Issued in Application No. 24172080.4, Sep. 18, 2024, 11 pages.

Song, X. et al., "Multi-factor mining and corrosion rate prediction model construction of carbon steel under dynamic atmospheric corrosion environment," Engineering Failure Analysis, vol. 134, Apr. 2022, 14 pages.

* cited by examiner

| OBJECTIVE | WET | SEMIWET | SEMIDRY | DRY |
|---|---|---|---|---|
| SOLUTION RESISTANCE SQ ERR INST | 0.3841 | 0.2425 | 0.1847 | 0.1469 |
| SOLUTION RESISTANCE SQ ERR CUM | 0.3841 | 0.2425 | 0.1847 | 0.1469 |
| SOLUTION RESISTANCE ABS ERR INST | 0.3841 | 0.2425 | 0.1847 | 0.1469 |
| SOLUTION RESISTANCE ABS ERR CUM | 0.3841 | 0.2425 | 0.1847 | 0.1469 |

METHOD AND TOOL FOR MODELING CHANGES IN SOLID MATERIALS CAUSED BY GALVANIC OR CHEMICAL INTERACTIONS

RELATED APPLICATIONS

This application claims priority to U.S. Provisional Patent Application 63/116,390, filed Nov. 20, 2020, the entirety of which is hereby incorporated by reference.

BACKGROUND

Corrosion is a natural process that converts a material into another form. Corrosion commonly occurs in refined metals that naturally convert to a more chemically stable form, such as an oxide, hydroxide, or sulfide. However, corrosion is not necessarily limited to metals. Different electrical or chemical processes might be responsible for corrosion. Corrosion can affect the material strength and other parameters of an object.

An example of corrosion is galvanic corrosion. Galvanic corrosion occurs when two metals with different electrochemical charges are linked via an electrical conduction path. Metal ions move from the anodic metal to the cathodic metal, thereby changing both metals and the boundary between the two metals. In highly complex objects with many parts, galvanic corrosion can arise in surprising locations due to non-obvious electrical pathways between distant parts in the object. The non-obvious electrical pathways may arise due to environmental conditions, such as the presence of a thin water film on the object.

More generally, changes to materials can arise over time when two materials are electrically or chemically coupled in some manner. Such electrical or chemical changes to the materials of an object may be deemed undesirable. Thus, it may be desirable to model how changes in solid materials occur over time due to the electrical (e.g., galvanic) or chemical interactions between the solid materials.

SUMMARY

The one or more embodiments provide for a method. The method includes receiving environmental data describing first physical parameters of an environment in which an object is located. The object includes a first material and a second material that galvanically or chemically interacts with the first material. The method also includes receiving sensor data describing second physical parameters of the object. The method also includes receiving a multi-state model of the object. The multi-state model includes distinct galvanic or chemical states of the object. Each of the distinct galvanic or chemical states represents a corresponding different equation applicable to a corresponding specific galvanic or chemical interaction between the first material and the second material. The method also includes performing a stochastic optimization operation on the multi-state model until convergence on candidate sets of galvanic or chemical material change rates for the distinct galvanic or chemical states of the object. The method also includes generating a correlation model for a surrogate parameter for the second physical parameters by correlating the environmental data to the sensor data using the candidate sets of galvanic or chemical material change rates. The method also includes generating an aircraft design using the correlation model.

The one or more embodiments provide for another method. The method includes receiving a correlation model. The correlation model is generated by receiving environmental data describing first physical parameters of an environment in which an object is located. The object has a first material and a second material that galvanically or chemically interacts with the first material. The correlation model is also generated by receiving sensor data describing second physical parameters of the object. The correlation model is also generated by receiving a multi-state model of the object. The multi-state model includes distinct galvanic or chemical states of the object. Each of the distinct galvanic or chemical states represents a corresponding different equation applicable to a corresponding specific galvanic or chemical interaction between the first material and the second material. The correlation model is also generated by performing a stochastic optimization operation on the multi-state model until convergence on candidate sets of galvanic or chemical material change rates for the distinct galvanic or chemical states of the object. The correlation model is also generated by generating the correlation model for a surrogate parameter for the second physical parameters by correlating the environmental data to the sensor data using the candidate sets of galvanic or chemical material change rates. The method also includes selecting a galvanic or chemical material change rate for the object from the candidate sets of galvanic or chemical change rates using the correlation model. The method also includes taking an action with respect to the object to reduce the galvanic or chemical material change rate.

The one or more embodiments provide for a method of improving a computer-generated model of a galvanic or chemical material change rate for an object having a first material and a second material that is capable of galvanic or chemical interaction with the first material. The method includes generating a surface construction of a film of wetness on the object. The method also includes determining a path of electrical conduction between the first material and the second material. Determining the path includes using a projected norm process that resolves a representation of the path. The method also includes inputting the path into a multi-state model of the object. The multi-state model includes distinct galvanic or chemical states of the object. Each of the distinct galvanic or chemical states represents a corresponding different equation applicable to a corresponding specific galvanic or chemical interaction between the first material and the second material.

The one or more embodiments also include a method of generating a computer-generated model of galvanic or chemical interaction in an object having a first material and a second material that is capable of galvanic or chemical interaction with the first material. The method includes receiving parameters describing physical parameters of the object. The method also includes generating modeled geometric surfaces of the object based on a model geometry of the object, a modeled thickness of a film disposed over surfaces of the object, and a direction of gravity relative to a selected orientation of the object. The method also includes generating connectivity information between subparts of the object that are electrically coupled via the film. The connectivity information includes points of contact between the first material and the second material. The method also includes generating a film model by generating electrical conduction paths for each of the points of contact and determining corresponding distances of the electrical conduction paths.

Other aspects of the one or more embodiments will be apparent from the following description and the appended claims.

DETAILED DESCRIPTION

Figure 1A:
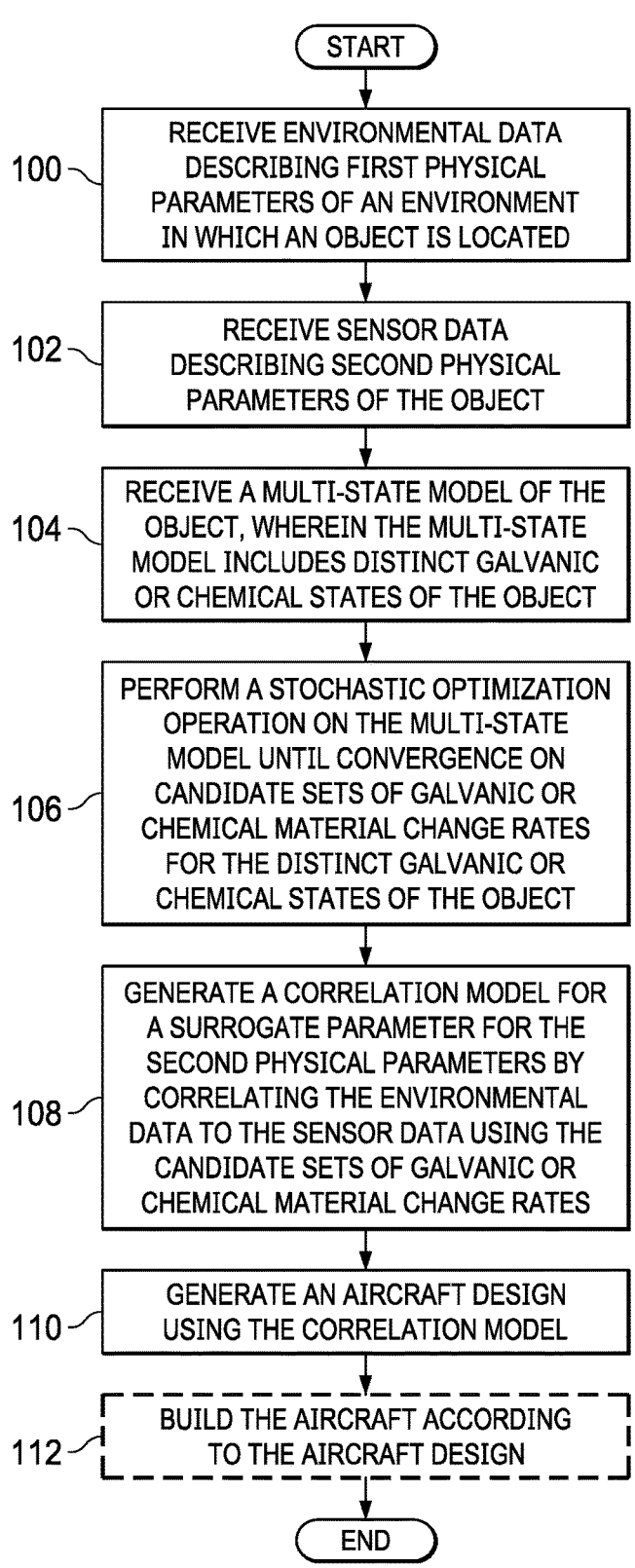
FIG. 1A, FIG. 1B, FIG. 1C, and FIG. 1D show methods of improving a computer to achieve convergence in modeling a material change rate in an object having a first material and a second material that galvanically or chemically interacts with the first material, in accordance with one or more embodiments.
Figure 1B:
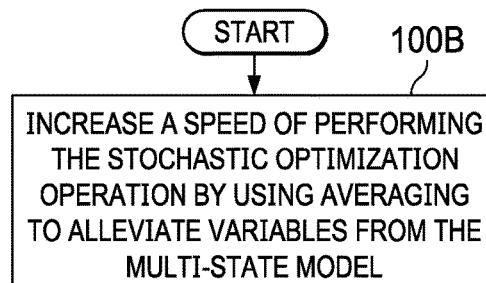

Specific embodiments of the one or more embodiments will now be described in detail with reference to the accompanying figures. Like elements in the various figures are denoted by like reference numerals for consistency.

In the following detailed description of the embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about."

As used herein, the term "connected to" contemplates at least two meanings. In a first meaning, unless otherwise stated, "connected to" means that component A was, at least at some point, separate from component B, but then was later joined to component B in either a fixed or a removably attached arrangement. In a second meaning, unless otherwise stated, "connected to" means that component A could have been integrally formed with component B. Thus, for example, assume a bottom of a pan is "connected to" a wall of the pan. The term "connected to" may be interpreted as the bottom and the wall being separate components that are snapped together, welded, or are otherwise fixedly or removably attached to each other. Additionally, the term "connected to" also may be interpreted as the bottom and the wall being contiguously together as a monocoque body formed by, for example, a molding process. In other words, the bottom and the wall, in being "connected to" each other, could be separate components that are brought together and joined, or may be a single piece of material that is bent at an angle so that the bottom panel and the wall panel are identifiable parts of the single piece of material.

In general, the one or more embodiments relate to improving the modeling of material change rates caused by electrical, chemical, or electrochemical reactions between different materials in a compound object. A compound object is an object made of two or more distinct materials. The distinct materials may be the same substances or different substances, though the materials are distinct in that they include at least a common boundary or an electrical or a chemical connection. For example, a wing on an aircraft and a tail on the aircraft may be formed of the same materials, but electrically connected as a compound object under certain wet or humid conditions due to a film of conductive impure water that forms between the wing, along the fuselage, and onto the tail of the aircraft. In this example, material change in and between the wing and the tail may occur over time due to the electrical pathway established by the film of water.

Modeling material changes over time due to electrical, chemical, or electrochemical interactions is valuable. For example, if it is known how material changes occur over time, then a maintenance schedule can be established to ensure that an object (e.g., an aircraft) performs within engineering tolerances. Similarly, knowing how a modeled object will materially change over time, design changes can be made to improve an object's resistance to such material changes.

With respect to building machines such as aircraft, galvanic or chemical material changes issues can be problematic, if realized after design and material selection for the aircraft. The issues are more problematic after manufacturing has started, as redesign, material selection, and possibly rebuilding can be undesirably expensive. Thus, using computers to predict or model galvanic or chemical material changes over time represents a technical challenge that has consequences for manufacturing and maintenance of complex, expensive machines.

An example of this problem can be expressed in the context manufacturing of certain aircraft. For example, prior to the one or more embodiments, an aircraft could have been designed and manufactured without knowing ahead of time the expected galvanic material changes over time in parts of the aircraft. After discovery of the out-of-tolerance galvanic material changes, huge and expensive changes are made during the manufacturing phase of the aircraft. In particular, in this example, a sub-optimal choice of material arrangements of aluminum and carbon-reinforced fiber polymers (CFRP) was made for certain parts of the aircraft. Since aluminum and CFRP realize an undesirable galvanic potential when placed in contact with each other, they are not compatible without expensive Titanium spacers to separate the two materials. Because of these changes, the aircraft subsequently contained many metric tons of Titanium per aircraft. The additional undesirable weight of the aircraft was required to reduce, to within acceptable engineering tolerances, expected galvanic material changes over the expected lifetime of the aircraft. However, the additional weight is undesirable because the additional weight increases fuel consumption during operation of the aircraft. Furthermore, re-design, re-tooling, and placement of the Titanium spacers added expense to the construction of the aircraft. Early consideration and realization of the galvanic material changes, using a computer model of the galvanic material changes over time, could have significantly reduced the amount of expensive Titanium needed, reduced the weight of the aircraft, and reduced expensive rework used in retooling the manufacturing of the aircraft.

Thus, the one or more embodiments relate to improvements in modeling material changes caused by electrical, chemical, or electrochemical processes, such as but not limited to galvanic corrosion. In particular, the one or more embodiments introduce an optimization scheme used to build a reliable model that can be used to estimate material change to a compound object over a period of time, including up to the expected lifetime of the compound object.

As described further below, the one or more embodiments could be employed in at least three different embodiments. The first embodiment provides for a stochastic optimization process that ensures that the full space of possible values of the material change rates is explored by using multiple single optimizations being executed throughout the space of possible material change rate values. Furthermore, multiple objective functions are used to evaluate different measurements of the error. By minimizing across the full stochastic optimization, the one or more embodiments concurrently minimize multiple measurements of error. The minimization results in a converged set of material change rates, which using traditional methods would be notoriously difficult to predict or estimate. The use of multiple objectives and stochastic optimization provides more confidence in the predicted result by considering multiple error measurements concurrently and ensuring that the full space of material change rates is explored.

The second embodiment provides for a model generated from the first embodiment that maps common environmental data to the surrogate quantity of wetness chosen in the multi-state model. For example, solution resistance is commonly used to measure wetness in the multi-state model. However, solution resistance requires expensive sensor technology to measure. By generating a correlated model to environmental data, environmental parameters can be used instead. Thus, the second embodiment alleviates the need for any sensor to be present. Either environmental data from common and much less expensive sensor technology could be used, or even historical or weather data could be used instead of directly measured data, possibly eliminating the need for any sensors. Additionally, the second embodiment still can predict a cumulative material change estimate tailored to a complex compound object, such as an aircraft, based on its operational schedules and environments encountered.

The third embodiment provides for a film model that can be used to find hidden electrical pathways between distant parts in a complex compound object, such as an aircraft. The film model may be used in either the first embodiment or the second embodiment. The film model uses a surface construction of the film, instead of a volumetric film construction. Surfaces are much simpler and easier to create than volumes, and constitute much less data, thereby improving the speed of processing models. As the film size increases, or as the film covers more of the model, a volumetric representation would scale very poorly and demand a large amount of time and data to represent. The use of surfaces alleviates the need for a volumetric representation. The one or more embodiments also avoids physics-based or computational fluid dynamics-based approaches, both of which are computationally expensive and time-consuming. Instead, in the third embodiment, a computer can determine the solution with much less time without using expensive software packages for physics or computational fluid dynamics simulations. Additionally, the one or more embodiments provide for an improved approach for determining the shortest path of electrical conduction between two materials through the film. In particular, the third embodiment uses an iterative projected norm calculation process that iteratively resolves an accurate path representation of otherwise hidden electrical connections in a complex compound object.

Attention is now turned to the figures. FIG. 1A through FIG. 4C are flowcharts, in accordance with one or more embodiments. The methods described with respect to FIG. 1A through FIG. 4C are all performed using a computer, as the one or more embodiments relate to solely computer-assisted modeling of material change rates. The one or more embodiments are designed to improve the speed and accuracy of the computer's ability to perform the modeling. Thus, the one or more embodiments relate to the technical aspects of how to program the computer to create more accurate and faster models, relative to prior techniques for using a computer to model material change rates.

Attention is first turned to FIG. 1A, FIG. 1B, FIG. 1C, and FIG. 1D, which show flowcharts of methods according to the one or more embodiments. The methods may be characterized as methods of designing an aircraft. The methods may also be characterized as addressing the technical challenge of improving a computer to achieve convergence in modeling a material change rate in an object having a first material and a second material that galvanically or chemically interacts with the first material.

At step 100, environmental data is received, the environmental data describing first physical parameters of an environment in which an object is located. Environmental data is data taken over time describing the environment of the compound object being modeled. For example, environmental data that can affect a material change rate in the compound object may include relative humidity, absolute humidity, temperature, wind speed, wind direction, pressure, precipitation, dew point, salt content, and chloride mass deposition, among others. The environmental data may be received from a variety of data sources, including sensors disposed on or near the object, and further including weather reports and other remote data that relates indirectly to the object.

At step 102, sensor data describing second physical parameters of the object is received. The sensor data is data taken by sensors that directly measure some physical parameter of the compound object. The term "second" is used only as a means for clear nomenclature. Examples of sensor data include temperature, material composition, spectroscopic analysis, etc. There is some overlap between sensor data and environmental data. However, primarily sensor data taken directly of the compound object itself, whereas the environmental data describes information about the environment in which the compound object is located. The sensor data may include solution resistance, polarization resistance, chemical measurements, dimensional measurements, etc., and combinations thereof.

At step 104, a multi-state model of the object is received. The multi-state model includes distinct galvanic or chemical states of the object. Each of the distinct galvanic or chemical states represents a corresponding different equation applicable to a corresponding specific galvanic or chemical interaction between the first material and the second material of the compound object. Note that the compound object could include more than two materials, and the embodiment contemplate a multi-state model that considers all of the interacting materials.

As used, herein the multi-state model refers to a model that contemplates multiple different states of the compound object. Each state represents a different condition to which the compound object is exposed, which may produce a different material change rate between the materials of the compound object. A more detailed description of the multi-state model is presented with respect to FIG. 5.

The one or more embodiments are related to the multi-state model, and more particularly relate to support development and use of the multi-state model. While the number of states and wetness considerations are varied, the actual calculation of the effective material change rates for a given multi-state model remains notoriously difficult and challenging to predict. Furthermore, the calculation of wetness to determine the appropriate state for a particular time interval can depend on the environmental model, environmental data available, and frequently still depends on sensor-fed environmental data, requiring prolonged data collection to determine an estimate of the model damage. The one or more embodiments address these and other technical challenges by improving generation and use of the multi-state model.

In particular, at step 106, performing a stochastic optimization operation is performed on the multi-state model until convergence on candidate sets of galvanic or chemical material change rates for the distinct galvanic or chemical states of the object. The stochastic optimization process dispatches multiple single optimizations, each of which evaluates the multi-state model for a candidate set of material change rates for the multi-state model. Thus, the stochastic optimization operation is performed by dispatching multiple single-objective optimization runs of the distinct galvanic or chemical states of the compound object to concurrently minimize different determinations of error for the distinct galvanic or chemical states. Dispatching may be performed according to one of: random dispatching, a lattice hypercube algorithm, an orthogonal array algorithm, or possibly other algorithms such as but not limited to a pattern search algorithm.

Performing the stochastic optimization operation ensures a thorough exploration of the full space of possible values of the material rates for the states in the multi-state model. By using multiple objective functions to simultaneously minimize different calculations of the error, a set of material rates are reached that converge all of the error measurements as much as possible. This approach differs from standard conventions where typically only one error measurement is used and optimized, and frequently the error measurement is only optimized directly, not using a stochastic process.

At step 108, a correlation model is generated for a surrogate parameter for the second physical parameters. The correlation model is generated by correlating the environmental data to the sensor data using the candidate sets of galvanic or chemical material change rates. As used herein, a "surrogate parameter" is a parameter that is used in place of another parameter that is more difficult to calculate or represent.

Figure 6:
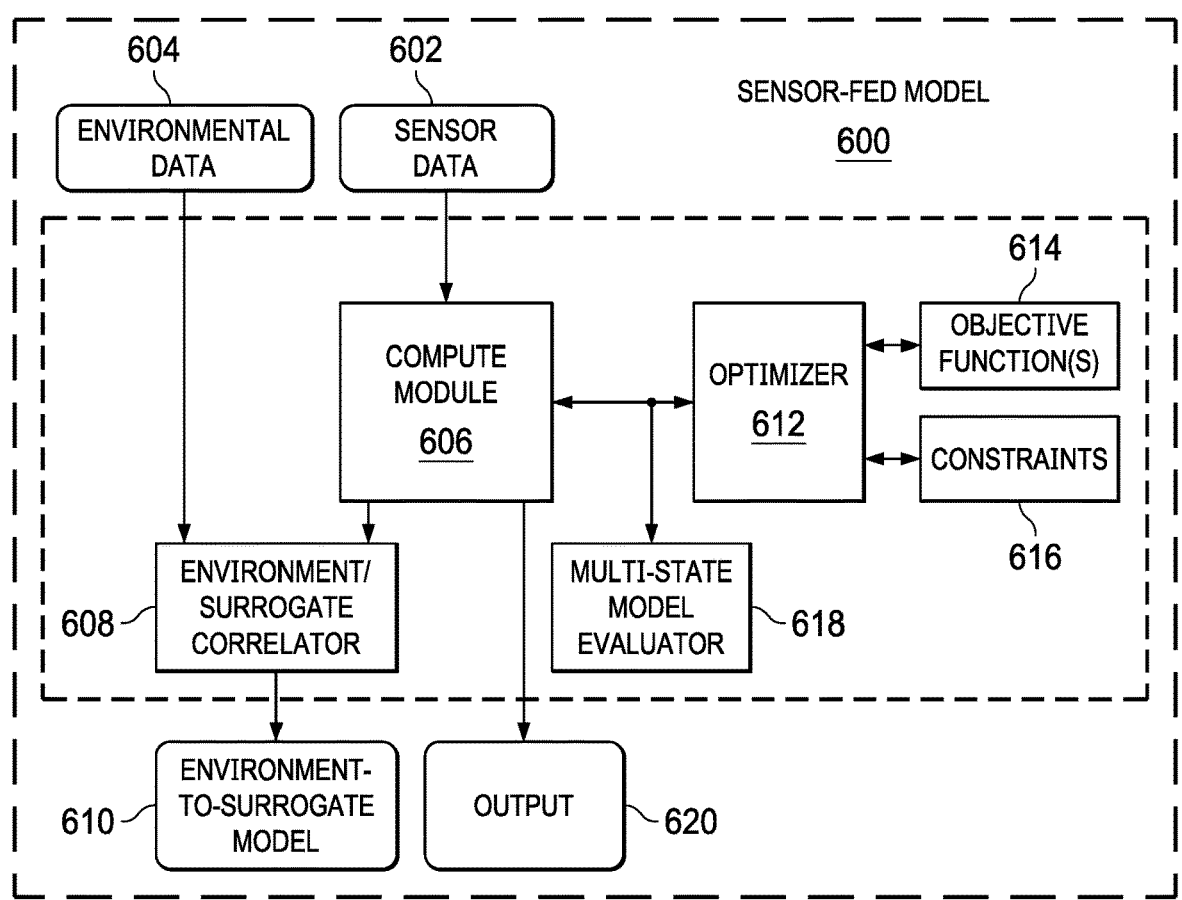
FIG. 6 is a block diagram of a process for using sensor-fed data to calculate an optimal material change rate and environmental model for relating environmental parameters to solution resistance, in accordance with one or more embodiments.

The material change rates are fed into a model generator component to generate a model that correlates environmental parameters to the surrogate quantity of interest (such as solution resistance). The result of this second step is shown in FIG. 6. The environmental model that can consume environmental data as inputs, and produce as an output an estimate of the correlated surrogate quantity (e.g., solution resistance). In turn, the surrogate quantity is matched in the multi-state model.

Thus, the one or more embodiments provide that the error optimization is performed based on a surrogate quantity that is known to correlate well to wetness, such as solution resistance. The use of the surrogate parameter improves the accuracy of the model and the speed of model generation. The original quantity is frequently not easily measurable, hence the value of the model generation step that correlates environmental data to the measured surrogate quantity. Thus, the surrogate quantity allows environmental parameters to be mapped to evaluate the original quantity (i.e., wetness) and hence use the correct optimal corrosion rate predicted.

At step 110, an aircraft design is generated using the correlation model. For example, an existing aircraft design may be changed based on information in the correlation model. As a more specific example, the correlation model may indicate that a part is likely to experience galvanic changes outside of desirable engineering tolerances over a set time period. As a result, the part design in the aircraft design is replaced or modified to reduce the probability of undesirable galvanic changes in the materials of the part. In another example, knowing expected galvanic changes over time in a part, the aircraft may be designed using parts that are known to be above a pre-determined tolerance to galvanic change. In still another example, parts of the aircraft may be re-arranged in the aircraft design. In yet another example, a maintenance plan for the aircraft may be modified or designed in order to account for expected galvanic changes in one or more parts. Many other variations are contemplated with respect to generating an aircraft design using the correlation model.

Optionally, at step 112, the aircraft is built according to the design. Thus, for example, the design may form a blueprint which is followed while manufacturing the aircraft or while performing maintenance on the aircraft. In this manner, the physical aircraft that results from the method will have parts that are predicted to have a desired resistance to galvanic changes over time.

As an alternative to step 110 step 112, the correlation model may be reported, either alternatively to or in addition to designing and/or building the aircraft. Reporting the correlation model is defined as storing or displaying the correlation model, or feeding the correlation model as input to another computer process. In any case, the method of FIG. 1A may terminate thereafter.

The method of FIG. 1A may be varied. For example, FIG. 1B may be performed as part of improving step 106 in FIG. 1A. In particular, at step 100B, a speed of performing the stochastic optimization operation is increased by using averaging to alleviate variables from the multi-state model. In particular, at step 100B, a speed of performing the stochastic optimization operation is increased by supplying additional constitutive equations that relate the states bounds to the material change rates, such as averaging the material change rates within each state defined by its bounds. This procedure alleviates variables from the multi-state model, thereby increasing the speed of performing the stochastic optimization. In one embodiment, the method of FIG. 1B may terminate thereafter.

Figure 1C:
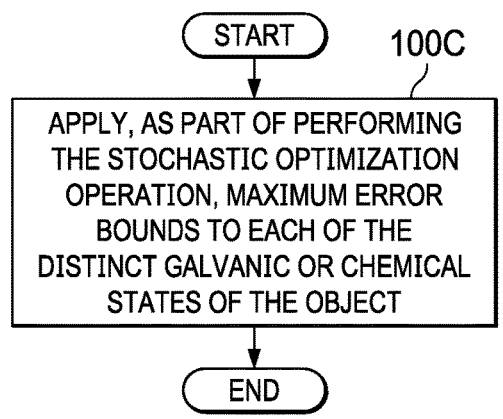

In another variation, FIG. 1C may also be performed as part of improving step 106 in FIG. 1A. At step 100C, as part of performing the stochastic optimization operation, maximum error bounds may be applied to each of the distinct galvanic or chemical states of the object. The maximum error bounds further increase the speed of convergence of the algorithm.

Furthermore, performing the stochastic optimization operation may include applying constraints to the multi-state model. The constraints may include: an absolute error of a corresponding material change rate for a corresponding selected state in the multi-state model, an absolute error of a cumulative material change for the corresponding selected state in the multi-state model, a square error of a material change rate for the corresponding selected state in the multi-state model, a square error of the corresponding material change rate for the corresponding selected state in the multi-state model, a spectral error metric for the corresponding material change rate for the corresponding selected state in the multi-state model, a periodic error metric for the corresponding material change rate for the corresponding selected state in the multi-state model, and combinations thereof.

Figure 1D:
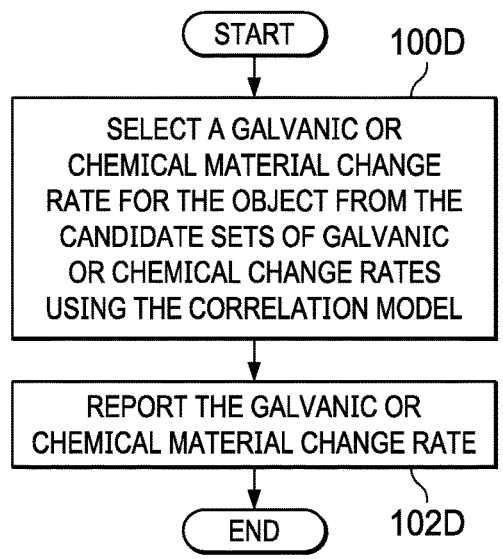
Figure 9:
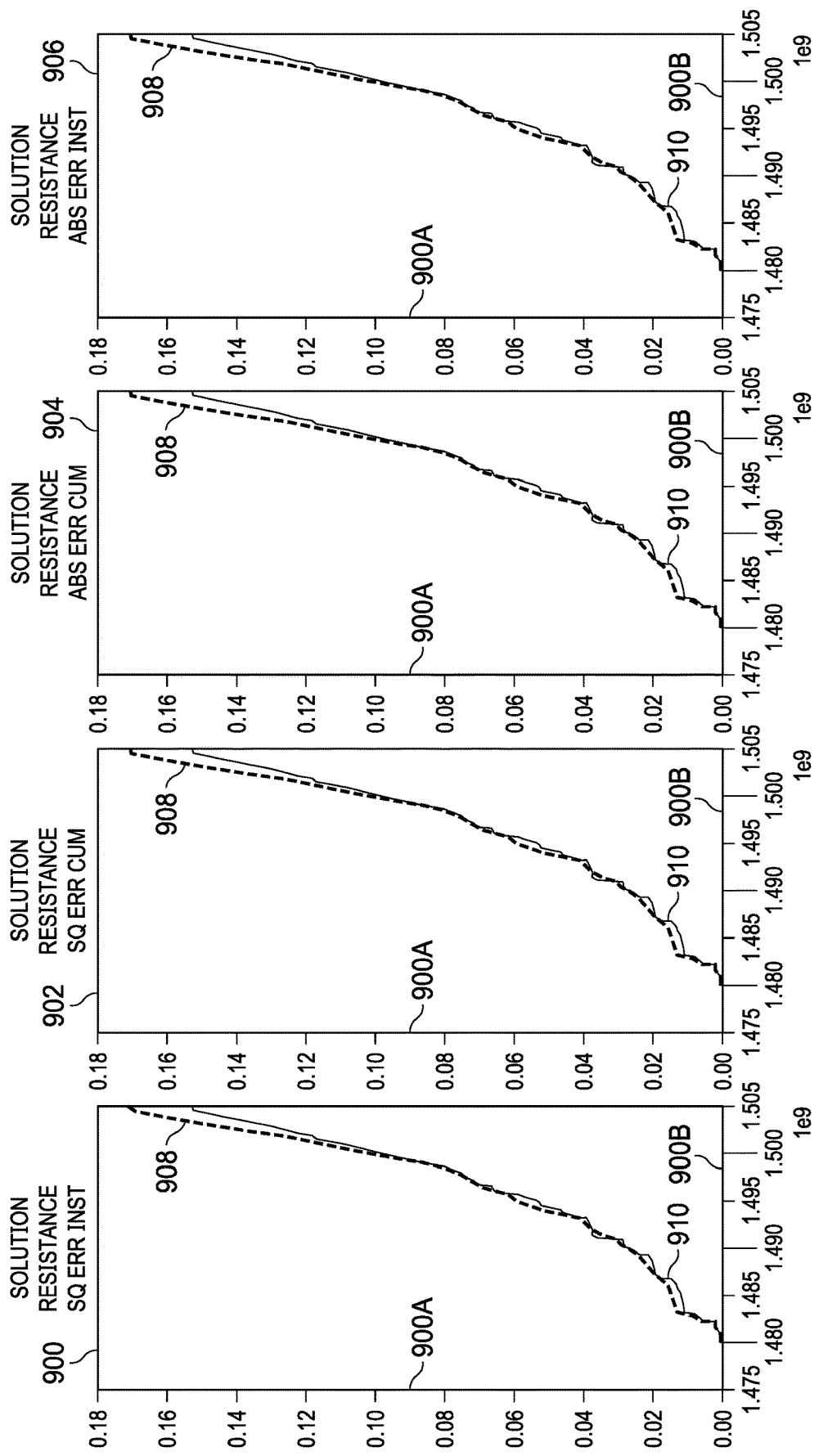
FIG. 9 shows four objective functions used for an optimization run in a stochastic optimization, in accordance with one or more embodiments.

In still another variation, FIG. 1D may be performed after step 110 of FIG. 1A. At step 100D, a galvanic or chemical material change rate is selected for the object from the candidate sets of galvanic or chemical change rates using the correlation model. Specifically, the correlation model itself identifies the optimal material change rate over time from among the candidate change rates. Examples of correlation models are shown in FIG. 9.

At step 102D, the galvanic or chemical material change rate is reported. Reporting the galvanic or material change rate is defined as storing or displaying the galvanic or chemical material change rate, or feeding the galvanic or chemical material change rate as input to another computer process.

Figure 2A:
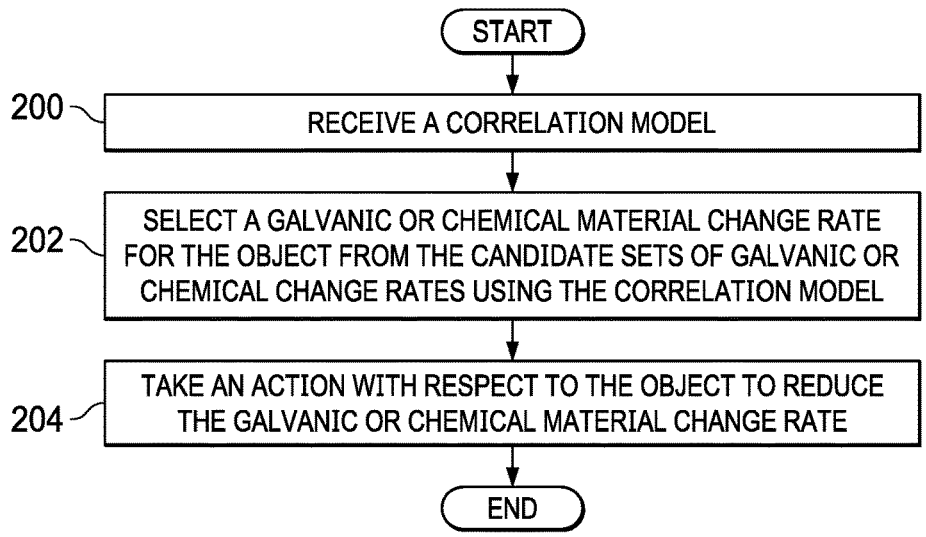
FIG. 2A and FIG. 2B show methods of taking an action with respect to an object to reduce the galvanic or chemical material change rate of the object, in accordance with one or more embodiments.
Figure 2B:
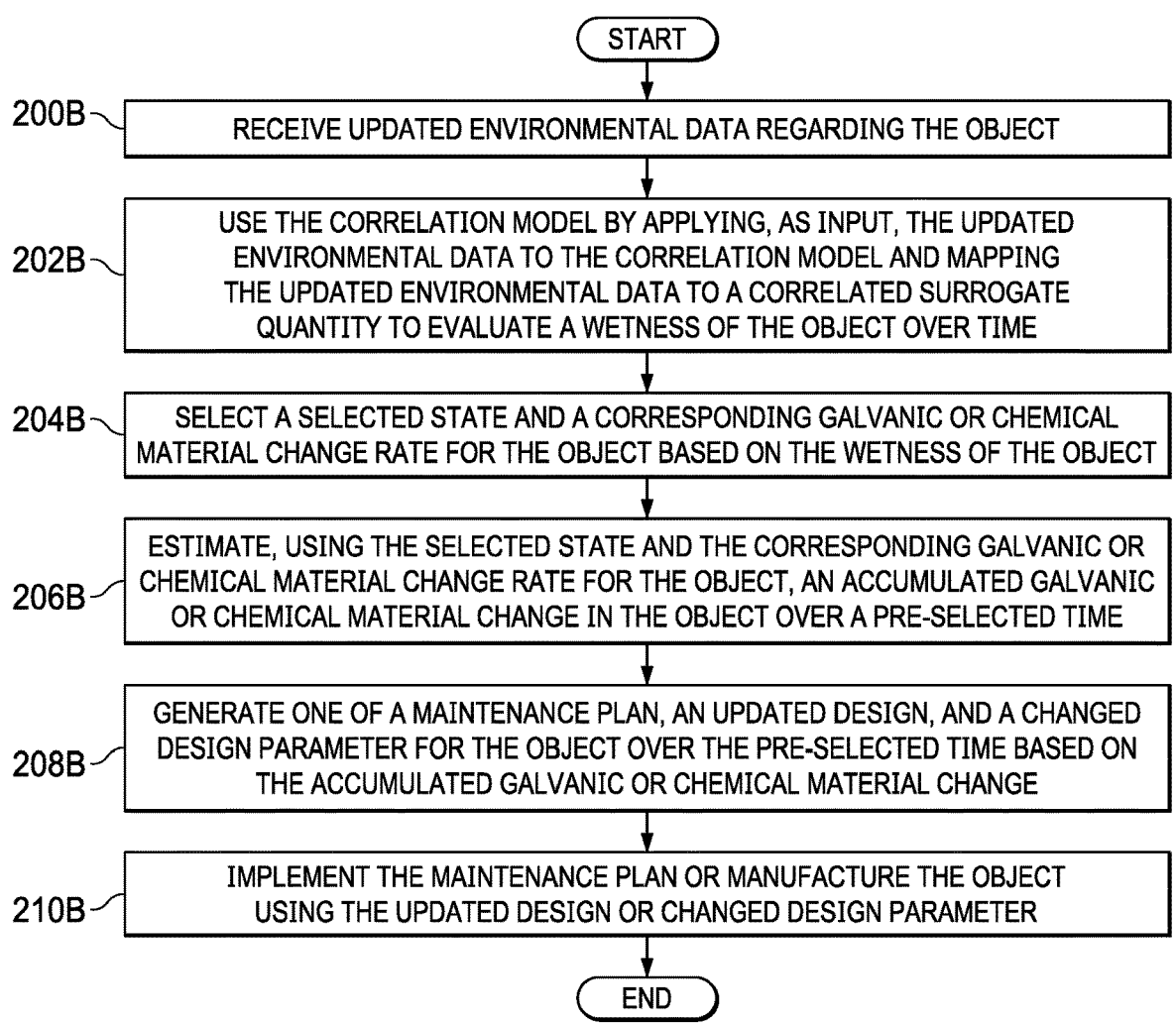

Attention is now turned to FIG. 2A and FIG. 2B, which show methods of taking an action with respect to an object to reduce the galvanic or chemical material change rate of the object, in accordance with one or more embodiments. The methods of FIG. 2A and FIG. 2B are applications of the reported correlation model or galvanic or chemical material change rate.

At step 200, a correlation model is received. The correlation model is generated according to the method of FIG. 1A or the alternative methods of FIG. 1B, FIG. 1C, or FIG. 1D.

At step 202, a galvanic or chemical material change rate for the object is selected from the candidate sets of galvanic or chemical change rates using the correlation model. In particular, the correlation model indicates the most likely material change rate. However, variations of the use of the correlation model are possible, as described with respect to FIG. 2B.

At step 204, an action is taken with respect to the object to reduce the galvanic or chemical material change rate. The action may be to perform maintenance the compound object to mitigate or reduce material change. The action may be to replace the compound object. The action may be to create a new design for the compound object and/or construct a new compound object according to the new design. Other actions are possible. In any case, the compound object is improved because the model is used to determine when or how maintenance or manufacturing should be performed with respect to the compound object.

The method of FIG. 2A may be varied. For example, FIG. 2B may be used to expand step 202 and step 204 of FIG. 2A.

For example, at step 200B, selecting the galvanic or chemical material change rate for the object at step 202 of FIG. 2A includes receiving updated environmental data regarding the object. Updated environmental data may is a new environmental parameter that has been changed or updated since the prior environmental data used.

At step 202B, the correlation model is used by applying, as input, the updated environmental data to the correlation model and mapping the updated environmental data to a correlated surrogate quantity to evaluate a wetness of the object over time. Thus, step 202B represents a specific example related to wetness, which is an environmental parameter that may affect galvanic material change in metallic compound objects. The updated environmental data is mapped to the correlated quantity, i.e., solution resistance, to evaluate the wetness of the object over time.

At step 204B, a selected state and a corresponding galvanic or chemical material change rate is selected for the object based on the wetness of the object. The material change rate varies with wetness. With the wetness estimated using the correlation model, the material change rate may be selected accordingly.

At step 206B, using the selected state and the corresponding galvanic or chemical material change rate for the object, an accumulated galvanic or chemical material change in the object is estimated over a pre-selected time. For example, a user may desire to know what the cumulative material change in the compound object is after 1 years, 10 years, 20 years, etc. The selected state and material change rate allows for an estimation of total material change in the compound object over time.

At step 208B, a maintenance plan, an updated design, or a changed design parameter for the object are generated over the pre-selected time based on the accumulated galvanic or chemical material change. For example, knowing the total expected material change over a twenty year expected lifetime of the compound object, one may estimate that maintenance is recommended every two years to address changed to the compound object over time. Similarly, an updated design of the compound object, or changed design, may be used to plan for a different compound object which is less susceptible to undesirable material changes.

At step 210B, the maintenance plan is implemented or the object is manufactured using the updated design or changed design parameter. In this manner, the one or more embodiments may be used to improve both the maintenance schedule for compound objects subject to material change, as well as the resistance of compound objects to material change.

Figure 3A:
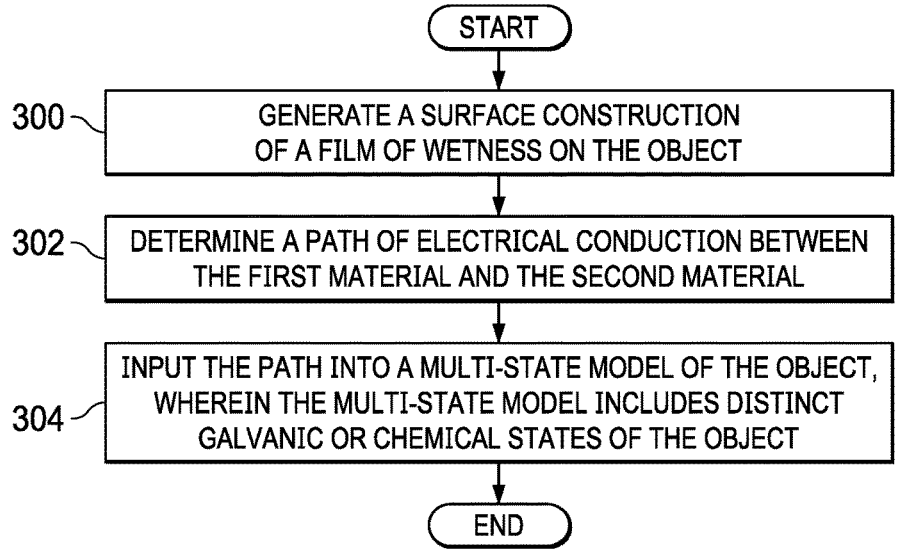
FIG. 3A, FIG. 3B, and FIG. 3C show methods of improving a computer-generated model of a galvanic or chemical material change rate for an object including a first material and a second material that is capable of galvanic or chemical interaction with the first material, in accordance with one or more embodiments.
Figure 3B:
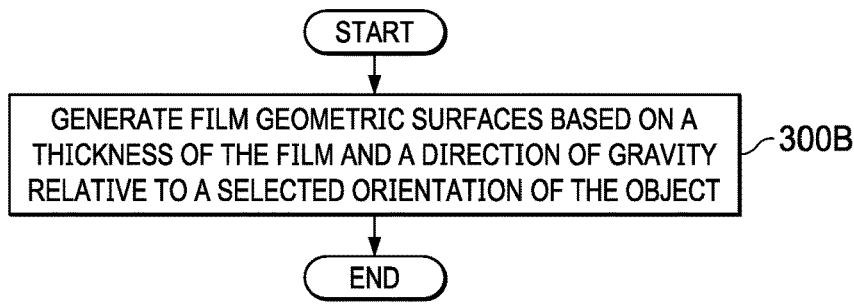
Figure 3C:
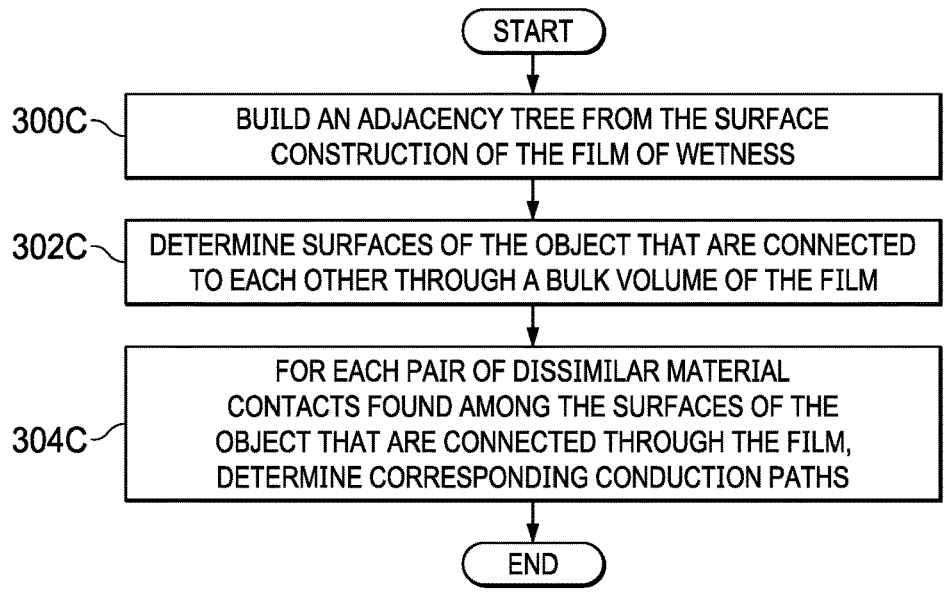

Attention is now turned to FIG. 3A, FIG. 3B, and FIG. 3C, which show methods of improving a computer-generated model of a galvanic or chemical material change rate for an object including a first material and a second material that is capable of galvanic or chemical interaction with the first material, in accordance with one or more embodiments. The method of FIG. 3A through FIG. 3C are variations that may be used to improve the inputs to the multi-state model described with respect to FIG. 1A through FIG. 2B.

At step 300, a surface construction of a film of wetness on the object is generated. The surface constriction of the film is generated using a computer to estimate how a film of water is distributed on the specific geometry of a specific object.

At step 302, a path of electrical conduction is determined between the first material and the second material. Determining the path includes using a projected norm process that resolves a representation of the path. The projected norm process is described further with respect to FIG. 12.

At step 304, the path is input into a multi-state model of the object. Thus, for example, the path may be part of the input to the multi-state model received at step 104 of FIG. 1A. As described above, the multi-state model includes distinct galvanic or chemical states of the object. Each of the distinct galvanic or chemical states represents a corresponding different equation applicable to a corresponding specific galvanic or chemical interaction between the first material and the second material. In any case, the method of FIG. 3A may terminate at this point.

The method of FIG. 3A may be varied. For example, generating the surface construction of the film of wetness at step 300 of FIG. 3A may be performed as described in FIG. 3B. In particular, at step 300B, film geometric surfaces are generated based on a thickness of the film and a direction of gravity relative to a selected orientation of the object. In particular, the one or more embodiments take into account an expected thickness of liquid on the compound object, and further how gravity may affect the thickness of the film. In turn, the thickness of the film can affect the material change rates at various locations over the compound object. An example of the generation of film geometric surfaces is described with respect to FIG. 15 through FIG. 17.

Attention is now turned to FIG. 3C. FIG. 3C is an example of determining a path of electrical conduction between materials in a compound object, as mentioned in step 302 of FIG. 3A.

At step 300C, an adjacency tree is built from the surface construction of the film of wetness. An example of building an adjacency tree is given as part of the description of FIG. 12.

At step 302C, surfaces of the object that are connected to each other are determined through a bulk volume of the film. In particular, if the film is in contact with two different portions of the object, and in at least some continuous path between the two different portions of the object, then the portions are "connected to each other" through the bulk volume of the film. For example, in the case of galvanic corrosion, two metal parts may be electrically connected to each other via a film of water between those two parts.

At step 304C, for each pair of dissimilar material contacts found among the surfaces of the object that are connected through the film, corresponding conduction paths are determined. The path of electrical conduction between the first material and the second material includes the corresponding conduction paths. An example of this process is described in FIG. 12, as well as FIG. 17 and FIG. 19.

Figure 4A:
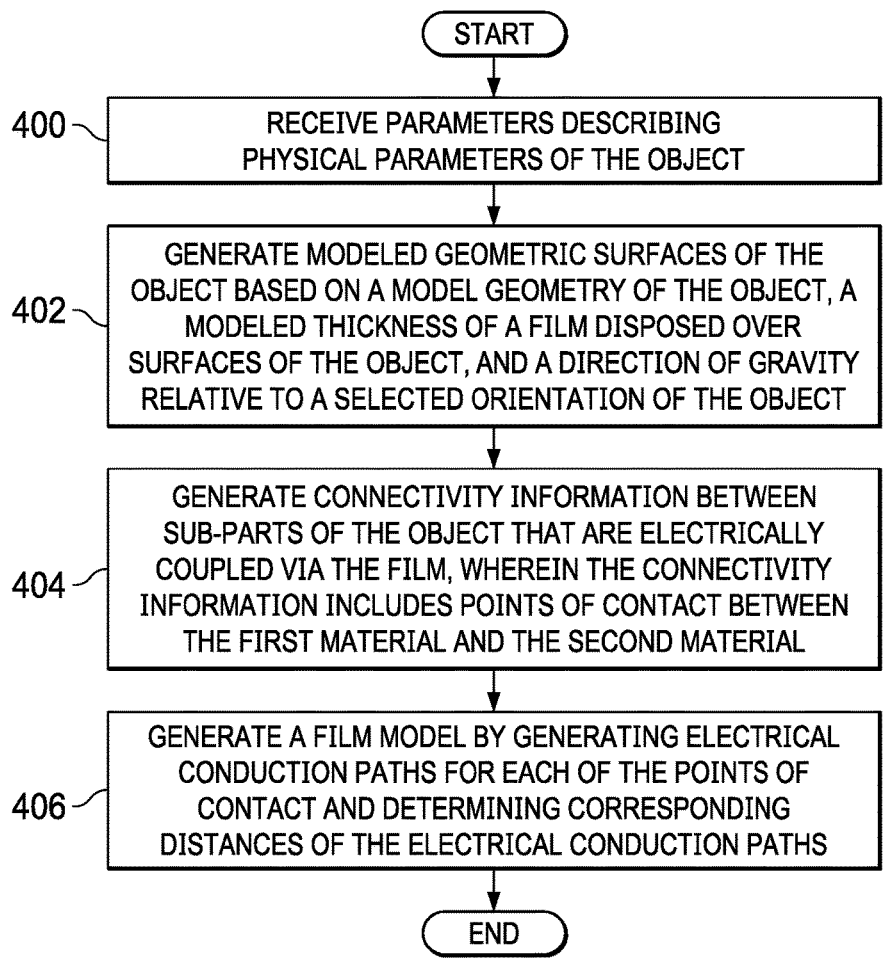
FIG. 4A, FIG. 4B, and FIG. 4C show methods of generating a computer-generated model of galvanic or chemical interaction in an object including a first material and a second material that is capable of galvanic or chemical interaction with the first material, in accordance with one or more embodiments.
Figure 4B:
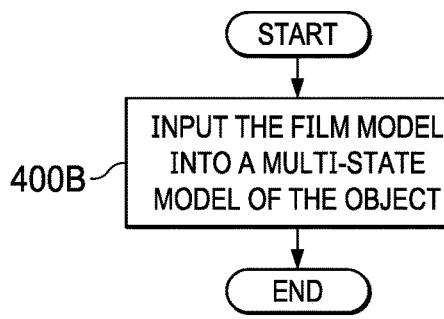
Figure 4C:
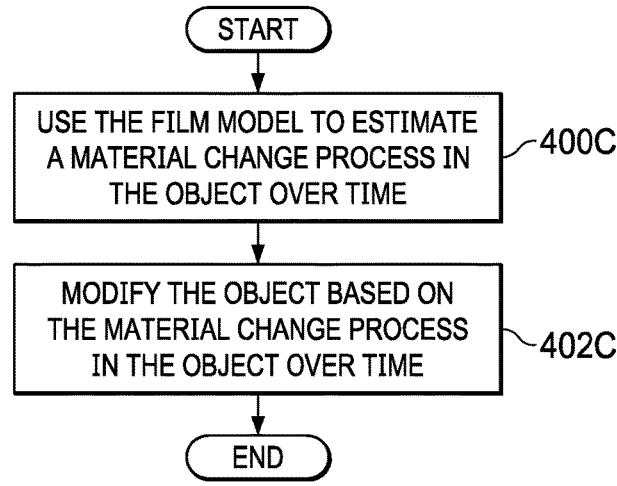

Attention is now turned to FIG. 4A, FIG. 4B, and FIG. 4C, which show methods of generating a computer-generated model of galvanic or chemical interaction in an object including a first material and a second material that is capable of galvanic or chemical interaction with the first material, in accordance with one or more embodiments. The method of FIG. 4A through FIG. 4C represent an alternative to the methods of FIG. 3A through FIG. 3C.

At step 400, parameters describing physical parameters of the object are received. The parameters include length, width, height, etc. of the various detailed portions of the surface of the object. The parameters may also include material type (e.g., metal, composite material, etc.), mass, electrical conductivity, etc. Thus, the material parameters may include a thickness of the object; thicknesses of different sub-components of the object; a material property of the object; material properties of different sub-components of the object; a material property of the film, and combinations thereof.

At step 402, modeled geometric surfaces of the object are generated based on a model geometry of the object, a modeled thickness of a film disposed over surfaces of the object, and a direction of gravity relative to a selected orientation of the object. In other words, the expected film is molded to the object based on gravity, orientation, etc. of the fluid. An example, again, is given in FIG. 14 through FIG. 19.

At step 404, connectivity information between sub-parts of the object that are electrically coupled via the film is generated. The connectivity information includes points of contact between the first material and the second material. Thus, for example, if sub-part A on the object and sub-part B on the object are connected by a continuous portion of the film, then the two sub-parts are considered electrically coupled and this coupling is recorded. In an embodiment, details of the expected electrical properties may be recorded, such as conductivity, resistance, etc.

At step 406, a film model is generated by generating electrical conduction paths for each of the points of contact and determining corresponding distances of the electrical conduction paths. Thus, for example, the model may include many different sets of sub-parts (points of contact) and the distances between those sub-parts. Again, an example is shown in FIG. 14 through FIG. 17. As a highly specific example, the object may be an aircraft. In this case, the first material and the second material may be indirectly connected to each other via the film. In one embodiment, the method of FIG. 4A may terminate thereafter.

The method of FIG. 4A may be varied. For example, as shown in FIG. 4B at step 400B, the film model may be input into a multi-state model of the object. In particular, the film model from FIG. 4A may be input into the multi-state model at step 104 of FIG. 1A. Again, the multi-state model includes distinct material change states of the object. Each of the distinct material change states represents a corresponding different equation applicable to a corresponding specific electrical or chemical interaction between the first material and the second material.

Attention is now turned to FIG. 4C. The method of FIG. 4C is a variation that includes using the film information generated using FIG. 4A or FIG. 4B.

At step 400C, the film model is used to estimate a material change process in the object over time. For example, the film model may be used to modify the multi-state model as described above. In turn, the improved multi-state model and stochastic process described above is used to estimate the material change process in the object over time, as described with respect to FIG. 1A through FIG. 1D.

At step 402C, the object is modified based on the material change process in the object over time. For example, knowing the total expected material change over a twenty year expected lifetime of the compound object, one may estimate that maintenance is recommended every two years to address changes to the compound object over time. Similarly, an updated design of the compound object, or changed design, may be used to plan for a different compound object which is less susceptible to undesirable material changes. Step 402C contemplates implementing the maintenance plan or manufacturing the object to mitigate, reduce, or prevent the material change process. In this manner, the one or more embodiments may be used to improve both the maintenance schedule for compound objects subject to material change, as well as the resistance of compound objects to material change.

While the various steps in the flowcharts of FIG. 1A through FIG. 4C are presented and described sequentially, one of ordinary skill will appreciate that some or all of the steps may be executed in different orders, may be combined or omitted, and some or all of the steps may be executed in parallel. Thus, the one or more embodiments are not necessarily limited by the examples provided herein.

FIG. 5 through FIG. 19 present other examples of the techniques described above with respect to FIG. 1A through FIG. 4C. The following examples are for explanatory purposes only and not intended to limit the scope of the one or more embodiments.

Figure 5:
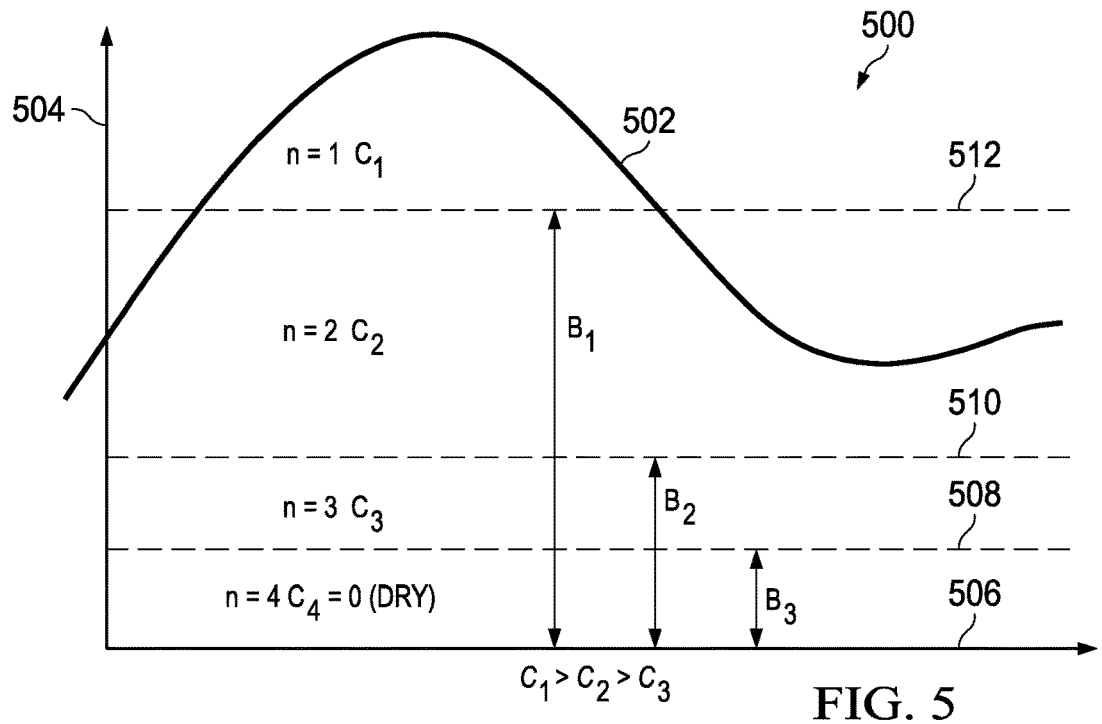
FIG. 5 is a graph of a four-state model for electrical or chemical material change over time, in accordance with one or more embodiments.

Attention is next turned to FIG. 5. FIG. 5 is a graph of a four-state model for electrical or chemical material change over time, in accordance with one or more embodiments. Multi-state model (500) is an example of a multi-state model that may be used with the methods described with respect to FIG. 1A through FIG. 4C. In the multi-state model (500), each instance of "$C_x$" (e.g., $C_1$) represents a different state for the multi-state model (500). Each state corresponds to a degree of wetness of the compound object over time, in this example.

The one or more embodiments may use different rates of corrosion severity represented relative to different amounts of wetness of a surface or material. For example, a two-state model considers a surface to be either dry or wet based on some environmental parameter (usually based on the value of the relative humidity, RH, or absolute humidity, H). The cumulative material change is calculated by summing the mass loss over different periods of time in which the wetness or time of wetness is known or estimated, as defined by the following equation (1)

$$TD = \sum_k R_k \cdot \Delta t_k \qquad (1)$$

Here TD is the total damage accumulated and $R_k$ represents the effective corrosion rate for time interval k, which is characterized by length of time $\Delta t_k$. The multi-state model (500) advocates that $R_k$ should be considered to be different values (equal to the number of states available in the multi-state model (500)) based on the local time of wetness. As an example, a two-state model based on relative humidity, RH, would advocate calculating the total damage TD using equation 1 with $R_k$ given as equation 2 (the multi-state model (500) would add more levels of "R"):

$$R_k = \begin{cases} R_{wet}, & \text{if } RH_k > B \\ R_{dry}, & \text{if } RH_k \le B \end{cases} \qquad (2)$$

Here k represents different time intervals of length $\Delta t_k$, and each is characterized by a specific local relative humidity value, $RH_k$. Hence, at some time interval k, if the value of the RH in this time interval is greater than a threshold value, B, then the surface is considered wet and a wet effective material change rate (usually a higher rate representing a higher corrosion severity) is applied, $R_{wet}$. Otherwise, if the value of RH in this time period is less than the selected threshold, then the surface is considered dry. In this case, a dry effective material change rate, $R_{dry}$, (usually a smaller rate representing a lower corrosion severity) is applied. Other values of wetness could be used, depending on the degree of wetness.

The multi-state model (500) has four states, and is shown diagrammatically in FIG. 5. Here, the curve (502) represents the surrogate quantity of interest representing wetness. In this example, the surrogate quantity of interest representing wetness is solution resistance. At each point along the x-axis (504), the y value of the y-axis (506) is used to evaluate which state of wetness applies. The states of wetness that could apply are represented by the dashed lines: y-axis (506) (dry), and line (508), line (510), and line (512) (various levels of wetness). Whichever state the value falls in determines the effective material rate that should be applied for that state of wetness.

The one or more embodiments is related to multi-state model (500), but represents a distinctly different capability to support development and use of the multi-state model (500). While the number of states and wetness considerations are often varied and published, the actual calculation of the effective material change rates for the multi-state model (500) remains notoriously difficult and challenging to predict. Furthermore, the calculation of wetness to determine the appropriate state for a particular time interval can depend on the environmental model, environmental data available, and frequently still depends on sensor-fed environmental data, requiring prolonged data collection to determine an estimate of the model damage. In particular, the one or more embodiments use a surrogate quantity for wetness (e.g., the curve (502), representing solution resistance) to eschew the difficulties with evaluating wetness, as described further below.

Figure 7:
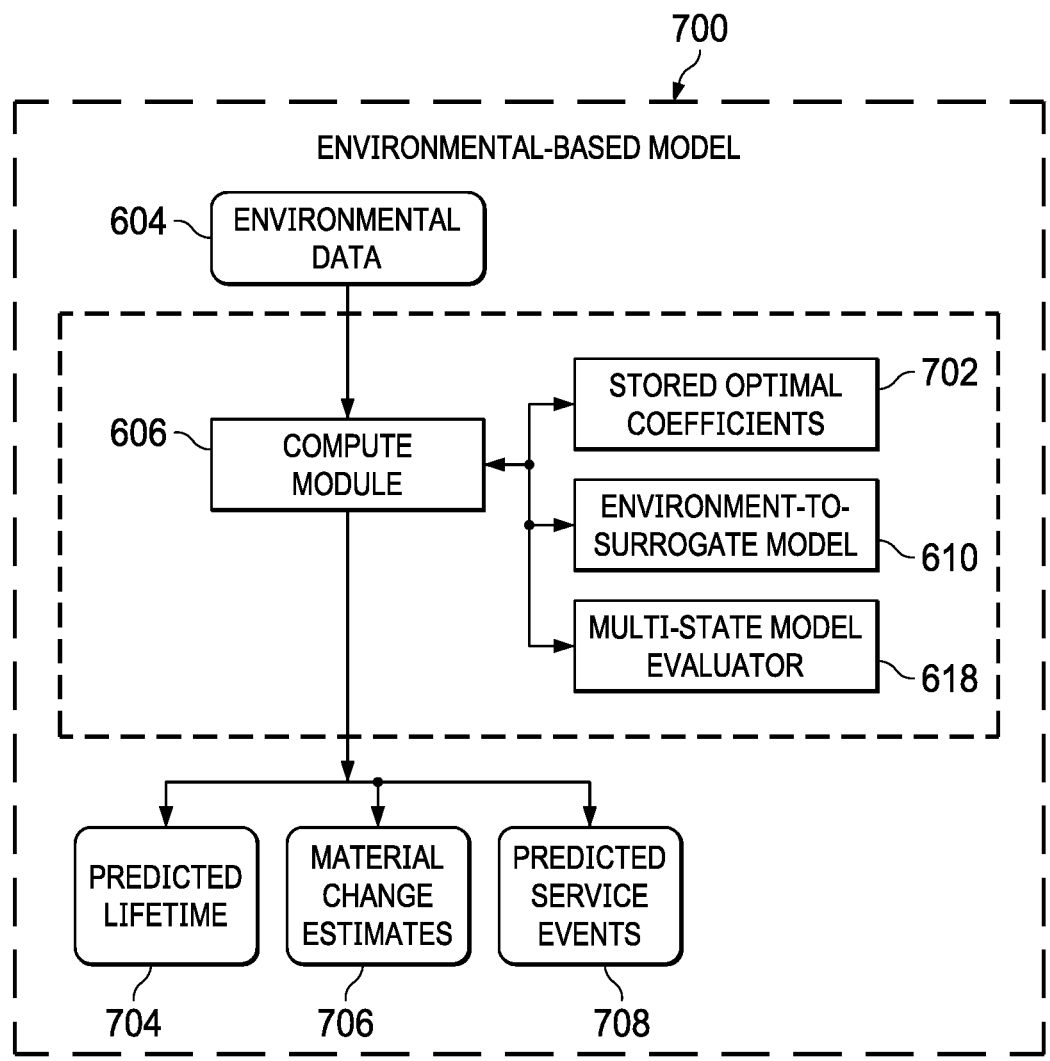
FIG. 7 is a block diagram of a process for using environmental data and outputs from the method of FIG. 6 to generate lifetime material change estimates and predicted service events for an object, in accordance with one or more embodiments.

Attention is now turned to FIG. 6 and FIG. 7. FIG. 6 is a block diagram of a process for using sensor-fed data to calculate an optimal material change rate and environmental model for relating environmental parameters to solution resistance, in accordance with one or more embodiments. FIG. 7 is a block diagram of a process for using environmental data and outputs from the method of FIG. 6 to generate lifetime material change estimates and predicted service events for an object, in accordance with one or more embodiments. The processes shown in FIG. 6 and FIG. 7 are alternatives to the methods described with respect to FIG. 1A through FIG. 2B. Reference numerals common to both FIG. 6 and FIG. 7 refer to the same objects or steps.

The process shown in FIG. 6 may implement the multi-state model (500) shown in FIG. 5 as part of generating optimal material change rates for the multi-state model. In particular, the process shown in FIG. 6 may be referred to as a sensor-fed model (600), because the model uses data measured by sensors disposed to take readings of the compound object of interest.

Thus, in the sensor-fed model (600), sensor data (602) is used. However, as described with respect to FIG. 1A, environmental data (604) may also be used, as described further below.

The sensor data (602) is provided to a compute module (606). The compute module (606) is computer hardware and/or software programmed to perform the procedures described with respect to FIG. 6. Thus, for example, the compute module (606) executes a optimizer (612), which is software programmed to optimize the multi-state model, such as the multi-state model (500) in FIG. 5. The optimizer (612) thus applies objective function(s) (614) and constraints (616) to the multi-state model evaluator (618). The multi-state model evaluator (618) then evaluates the multi-state model (500) in FIG. 5 accordingly to produce the output (620). The output (620) is the mathematically optimized material change rates for the multi-state model (500) shown in FIG. 5.

The compute module (606) is also in communication with the environment and surrogate correlator (608). The environment and surrogate correlator (608) is hardware and/or software design to correlate the surrogate parameter to the sensor parameter. The output of the environment and surrogate correlator (608) is the environment to surrogate model (610), described further below.

In more detail, the process of the sensor-fed model (600) may be described as follows. The environmental data (604), which includes values such as relative humidity, absolute humidity, local temperature, local pressure, local precipitation, etc. is provided to the environment and surrogate correlator (608). Additionally, the sensor data (602), which includes measurements of a selected surrogate quantity (i.e., solution resistance, polarization resistance, etc.), is fed to the compute module (606).

The compute module (606) executes the multi-state model evaluator (618) that consumes user-specified information (number of states, state corrosion rates, etc.) and returns a material change accumulation estimate based on the inputs The optimizer (612) is a stochastic optimization process built on a continuous optimizer. The compute module (606) also applies the objective function(s) (614), which may be described as a series of error-evaluation objective functions. The objective function(s) (614) may include a number of different functions. The functions may include, for example, an absolute error of the material change rate; an absolute error of the cumulative material change; a square error of the material rate; and a square error of the cumulative material change. In turn, the constraints (616) may include the maximum error bounds applied to each component in the optimizer (612), which again may be characterized as a stochastic optimizer.

The environment and surrogate correlator (608) may be described as a model generator component. The model generator component can consume a number of the environmental data (604) and sensor data (602) of the selected surrogate quantity (e.g., solution resistance) and construct an environment to surrogate model (610). The environment to surrogate model (610) may be characterized as a correlated model that provides an estimate of the material change rate, within some error of the solution resistance based on the environmental data parameters.

The sensor-fed embodiment of the sensor-fed model (600) depends on the availability of some sensor measurements of a selected surrogate quantity. The compute module (606) is configured to use a stochastic optimization process and multiple objective functions and constraints. The stochastic optimization process dispatches multiple single optimizations, each of which evaluates the multi-state model (e.g., multi-state model (500)) for a candidate set of a corrosion rates for the multi-state model.

Multiple objective functions ensure that multiple different evaluations of error are all minimized concurrently. The result of this step is the output (620), which includes the optimal material change rates for the user-specified multi-state model. These material change rates can also be fed into the environment and surrogate correlator (608) to generate the environment to surrogate model (610) that correlates environmental parameters to the surrogate quantity of interest. In turn, the environment to surrogate model (610) can consume environmental data as inputs, and produce an estimate of the correlated surrogate quantity (e.g., solution resistance) that is matched in the multi-state model (e.g., the multi-state model (500) of FIG. 5).

The use of the stochastic optimization process ensures a thorough exploration of the full space of possible values of the material rates for the states. By using multiple objective functions to simultaneously minimize different calculations of the error, a set of material change rates are reached that converge most or all of the error measurements as much as possible. This process differs from standard conventions where typically only one error measurement is used and optimized, and frequently is only optimized directly, without using a stochastic process.

Additionally, the optimization is performed based on a surrogate quantity that is known to correlate well to the measure of wetness of the compound object, such as solution resistance. This quantity is frequently not easily measurable without expensive sensors; hence, the value and novelty of the model generation step that correlates environmental data to the measured surrogate quantity. The correlation allows environmental parameters to instead be mapped to evaluate the wetness, and hence use the correct optimal corrosion rate predicted. Another aspect of the method of FIG. 6 is the use of the averaging to alleviate a large number of variables from the optimization problems, allowing faster convergence, and thereby improving the speed of the computer with respect to executing the model. Such averaging is discussed at step 100B in FIG. 1B. Nevertheless, in general, the one or more embodiments apply additional constitutive equations that couple some of the optimization variables, hence overall reducing the number of variables and improving convergence towards an accurate solution.

Attention is now turned to the method of FIG. 7. The process shown in FIG. 7 is complimentary to the process shown in FIG. 6. The process shown in FIG. 7 may be referred-to as an environmental-based model (700).

In the embodiment of FIG. 7, the environmental data (604) is again provided to the compute module (606). However, the compute module (606) also takes, as input, stored optimal coefficients (702) from past evaluations of the material change rate of the compound object. The compute module (606) also takes as input the environment to surrogate model (610) and the output of the multi-state model evaluator (618).

The output of the environmental-based model (700) is the predicted lifetime (704) and the material change estimates (706) for the compound object, based on the material change rate estimates. Additionally, predicted service events (708) may be computed. The predicted service events (708) are times when the compound object may be expected to receive service or maintenance in order to mitigate or reduce material change, or to replace the compound object.

The embodiment of FIG. 7 uses the outputs from the embodiment of FIG. 6 as subcomponents. Consider a case where sensor measurements of a surrogate, such as solution resistance, are optimized to determine the best fit of corrosion rates for a multi-state model, and a subsequent environmental model correlating to the surrogate of interest (solution resistance) is output. Then, one can create a second embodiment that uses these outputs to permit the estimation of lifetime, material change estimates, and predictions of maintenance and service events required to mitigate material change to a vehicle platform based solely on environmental data.

In the embodiment of FIG. 7, the optimal corrosion rates matching the surrogate quantity of interest (e.g., solution resistance) have already been calculated. Additionally, already present is a model for mapping environmental parameters to that surrogate quantity. Now, the process of FIG. 7 can receive inputs of environmental data (relative and/or absolute humidity, temperature, pressure, precipitation events, etc.).

The embodiment of FIG. 7 may use a more compact compute module (606) to evaluate the multi-state model by mapping the input environmental data (604) into the correlated surrogate quantity. The mapping is then used to evaluate the wetness of the model. The wetness selects the proper state and proper corresponding state corrosion rate (optimized from the first embodiment), which is then used in the multi-state evaluation to calculate the total estimate of the accumulated material change over a period of time or different intervals of time.

The total estimate leads to a series of outputs, including the predicted lifetime (704), the material change estimates (706), and the predicted service events (708), all particular to given user-specified events or time periods for the environmental data (604). In the environmental-based model (700), the environmental data (604) does not need to be sensor data. Instead, the environmental data (604) could be weather data measurements for different environments that an aircraft or vehicle platform is expected to be flown through. Such data, which is much easier to retrieve than the sensor data (602) of FIG. 6, may then be used to calculate service events for particular vehicles tailored to their actual flight schedules.

Figure 8:
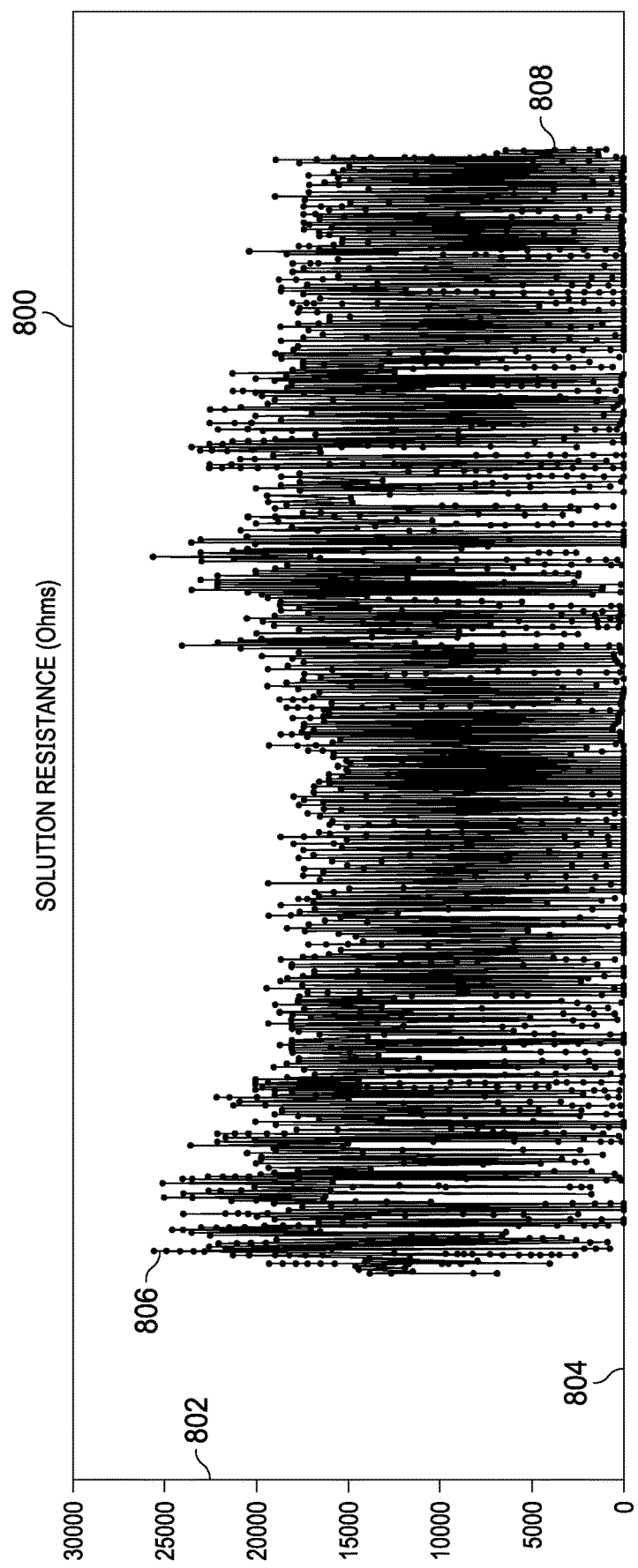
FIG. 8 is a graph of solution resistance from real sensor data in two galvanically interacting parts, in accordance with one or more embodiments.

Attention is now turned to FIG. 8. FIG. 8 is a graph of solution resistance from real sensor data in two galvanically interacting parts, in accordance with one or more embodiments. The graph (800) shown in FIG. 8 is an example of an experimental use of the models and processes described with respect to FIG. 6 and FIG. 7. The data reflected in the graph (800) was taken over approximately a two-year period for a complex object subject to galvanic corrosion, a type of material change process modeled by the one or more embodiments.

In the graph (800), solution resistance was considered a surrogate quantity that corresponded well to measuring the wetness in the sensor data set. The Y-axis (802) represents the solution resistance in Ohms. The X-axis (804) represents time. While the units of time are omitted, the overall length of the data set represents approximately a two year time period. Each point in the graph (800), such as point (806) or point (808) represents solution resistance measurements at a particular time within that time period.

Figures 10, 11:
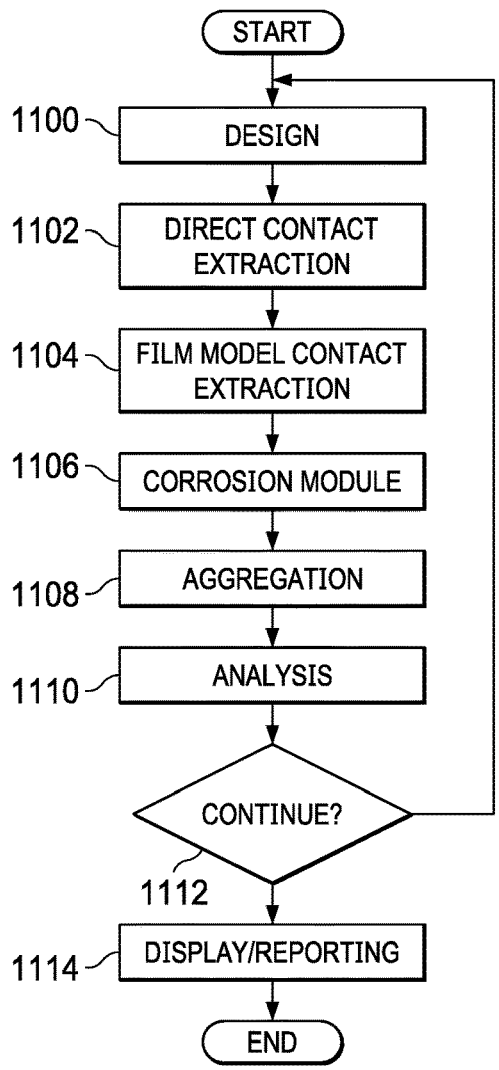
FIG. 10 shows results of material change rates converged by the four different objective functions shown in FIG. 9, in accordance with one or more embodiments.
FIG. 11 shows a flow diagram of an overall process for improving a material change rate model, in accordance with one or more embodiments.

Attention is now turned to FIG. 9 and FIG. 10, which should be considered together. FIG. 9 shows the results of four objective functions used for an optimization run in a stochastic optimization, in accordance with one or more embodiments. FIG. 10 shows results of material change rates converged by the four different objective functions shown in FIG. 9, in accordance with one or more embodiments.

FIG. 9 represents four comparisons between the actual material change caused by a real galvanic corrosion process and different functions of the modeled total material change estimated for the galvanic corrosion process. The modeled totals were estimated using the one or more embodiments of FIG. 5 and FIG. 6. Each graph (i.e., graph (900), graph (902), graph (904), and graph (906)) represents a different comparison using the same underlying data from FIG. 8 and the models and processes described with respect to FIG. 5 and FIG. 6. For each graph, (i.e., for all of graph (900), graph (902), graph (904), and graph (906)), the axes indicate cumulative material loss (along Y-Axis (900A)) and units of time (along X-Axis (900B)).

Specifically, FIG. 9 shows four objective function results from one full stochastic optimization run (consisting of 60 individual gradient-descent single optimization runs for each objective function). The dashed lines (908) represent the multi-state evaluation of the predicted total material change using the optimized corrosion rates. The solid lines (910) represent the sensor-measured cumulative material change (i.e., the actual corrosion that occurred). As can be seen, the predictions of the one or more embodiments closely match the actual outcomes.

Stated differently, the model of FIG. 6 was deployed on the data of FIG. 8 to generate a set of optimized coefficients for a four-state model based on the solution resistance, resulting in the comparisons of FIG. 9. The process used a stochastic optimization process using 60 separate optimization runs and 4 different objective functions to ensure convergence of the corrosion rates measured from this sensor data.

FIG. 10 shows the final values of the corrosion rates for that single stochastic optimization step. Table 1000 shows that the use of four objectives confirms that the corrosion rates have been found identically for four different measurements of the error, and that each objective functions agrees well with each other.

Attention is now turned to FIG. 11 through FIG. 19, which should be considered together. The material change modeling tool and process described with respect to FIG. 1A through FIG. 2B and FIG. 5 through FIG. 9 may use the film modeling techniques described with respect to FIG. 3A through FIG. 4C and FIG. 11 through FIG. 19.

FIG. 11 shows a flow diagram of an overall process for improving a material change rate model, in accordance with one or more embodiments. FIG. 12 through FIG. 19 relate to film model contract extraction (step 1104 of FIG. 11).

At step 1100, the design step, the multi-state model is designed for the compound object, as described with respect to FIG. 5. At step 1102, direct contact information between various sub-components of the compound object is extracted. At step 1104, film model contact extraction is performed, as described further below with respect to FIG. 12 through FIG. 19. At step 1106 the corrosion model is executed, as described with respect to FIG. 6. At step 1108, the information processed by the corrosion model is aggregated. At step 1110, the aggregated information is analyzed.

At step 1112, a determination is made whether to continue. For example, if actual material change and material change rate data is available for the compound object, then further improvement of the model is possible if agreement between the model and the sensor data are not within a threshold degree of agreement. If the process is to continue, then the process returns to step (1100) and repeats. Otherwise, at step 1114, the output is displayed or otherwise reported. In one embodiment, the method of FIG. 11 may terminate thereafter.

Figure 12:
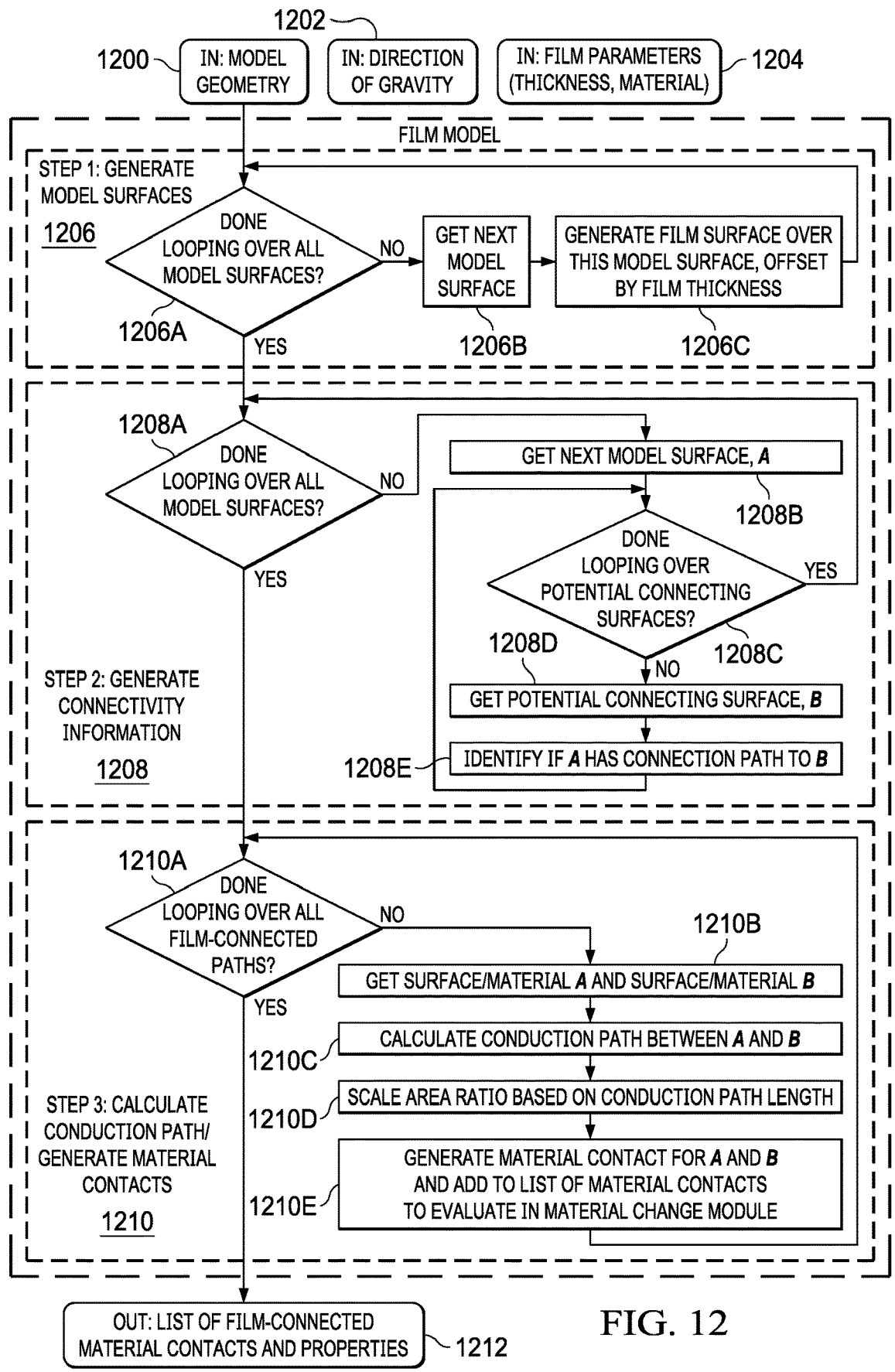
FIG. 12 shows a detailed flow diagram for producing a film model used in the overall process of FIG. 11, in accordance with one or more embodiments.

Attention is now turned to FIG. 12. FIG. 12 shows a detailed flow diagram for producing a film model, at step 1104, of FIG. 11, in accordance with one or more embodiments. Overall, the inputs to the process are the model geometry (1200), the direction of gravity (1202) relative to an orientation of the object, and film parameters (1204) such as thickness, material, etc.

The process includes three major steps. Step 1 (1206) is to generate the model surfaces. Step 2 (1208) is to generate connectivity information. Step 3 (1210) is to calculate the conduction path and generate material contacts. These three steps are presented in more detail below.

The process begins at step 1 (1206). At step 1206A, a decision is made whether the process of looping over all model surfaces of the compound object has been done. If yes, then the process proceeds to step 2 (1208). Otherwise, at step 1206B, the next model surface is retrieved. Then, at step 1206C, a film surface is generated over the model surface, offset by film thickness. The process then returns to step 1206A.

Attention is now turned to step 2 (1208). Initially, at step 1208A, a decision is made whether looping all model surfaces has been completed. If yes, then the process proceeds to step 3 (1210). Otherwise, at step 1208B, the next model surfaces (labeled "A") is retrieved.

At step 1208C, a determination is made whether looping over all potential connecting surfaces has been performed. If yes, then the process returns to step 1208A and repeats. Otherwise, at step 1208D, the potential connecting surface (labeled "B") is retrieved. Then, at step 1208E, an identification is made whether surface "A" has a connection path to surface "B". The connection path is an electrical or chemical connection which may result in a material change in the compound object. Thereafter, the process of step 2 (1208) returns to step 1208C and continues to repeat until a "yes" result is achieved at step 1208A.

At step 3 (1210), initially at step 1210A, a determination is made whether looping over all film-connected paths has been completed. If not, then at step 1210B, a retrieval is performed of the surface and material characteristics of surface A and the surface and material characteristics of surface B. Then, at step 1210C, a calculation is performed of the conduction path between surface A and surface B. At step 1210D, an area ratio is scaled based on the conduction path length. Further information regarding step 1210D is presented in FIG. 13. At step 1210E, a material contact is generated for surface A and for surface B. Also at step 1210E, the material contact is added to a list of material contacts to evaluate in the material change module.

The process then returns to step 1210A and repeats. The process of step 3 (1210) continues to repeat until a "yes" determination is made at step 1210A. At that point, at step 1212, an output is generated. The output is a list of film-connected material contacts and properties.

Additional details and a different description of the above method is now presented. The film model of the one or more embodiments assumes that the inputs provided include the model geometry (of the aircraft or part or other compound object), the direction of gravity, and the thickness and material properties of the film. With these inputs, the film model performs the following three sequential steps.

At step 1 (1206), the process generate the film model geometric surfaces, based on the model geometry, film thickness, and direction of gravity. Inclusion of the direction of gravity permits 'tilted' films to be constructed. It is also possible to include additional forces such as rotation or centripetal acceleration (e.g., film buildup on a spinning helicopter rotor blade).

At step 2 (1208), the process generates connectivity information. The connectivity information relates connectivity between the part geometry connected through the film. The connectivity information may take one of several forms, including an adjacency tree or matrix. Each dissimilar material connected through the tree is identified as another material contact to be evaluated by the corrosion module.

At step 3 (1210), the process generates electrical conduction paths for each film-connected material contact identified. The area ratio factor used is scaled by the length of the conduction path. The result of these steps is a list of film-connected material contacts, scaled by the film parameters and by the contact connection path distance. The list is added to the list of direct-contact material contacts that are subsequently evaluated by the corrosion module. This process adds more material contacts, including those connected via electrical paths through films produced by environmental conditions.

In summary, in step 1 (1206), the model surfaces are iterated over, and the film surface is adjusted or new film surfaces are created based on the offset of the model and the direction of gravity. This step generates the geometry needed for the remaining two steps. In step 2 (1208), the adjacency and connectivity of the model components through the film are generated. These components could be implemented as a tree or matrix representation. In step 3 (1210), an iteration is performed over the connections found through the film. For each connection, a conduction path connecting the two materials is identified. The area ratio factor is scaled by the conduction length found to account for the distance. A material contact is generated representing this connection. The material contacts created in this step are then added to the list of direct-contact material contacts already determined. The full list is then submitted for evaluation to the corrosion module (see FIG. 5) for contact evaluation.

Figure 13:
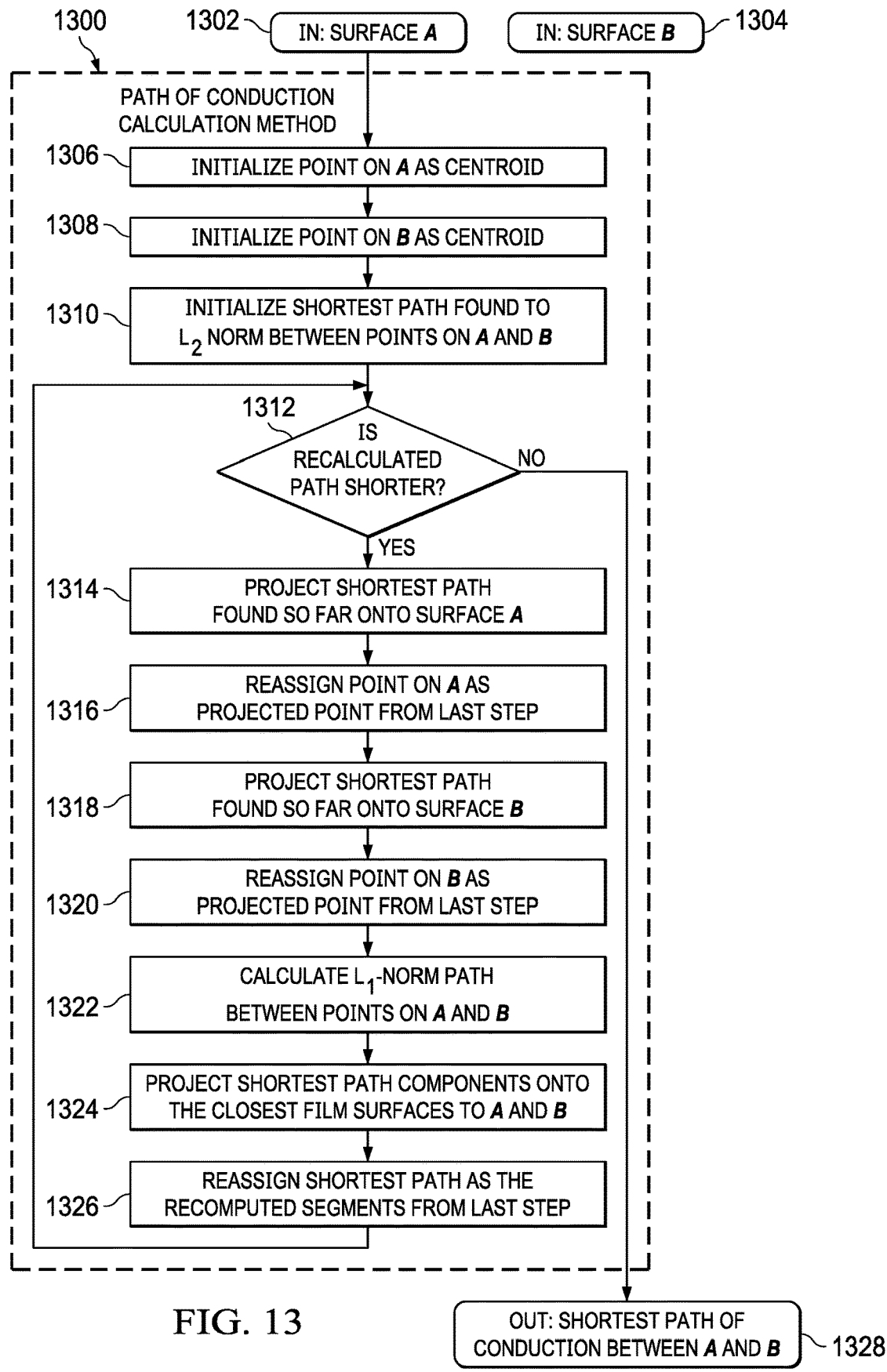
FIG. 13 shows a detailed flow diagram for the electrical path conduction step between two surfaces, A and B, in accordance with one or more embodiments.

Attention is now turned to FIG. 13. FIG. 13 shows a detailed flow diagram for the electrical path conduction step between two surfaces, A and B, in accordance with one or more embodiments. FIG. 13 represents details for a process for calculating the conduction path between surface A and Surface B, described at FIG. 12, step 1210C. The method (1300) is shown within the dashed lines. The inputs to the method (1300) are the surface A (1302) and the surface B (1304).

The method (1300) begins at step 1306. At step 1306, a point on the surface A (1302) is initialized as a centroid. Then, at step 1308, another point on the surface B (1304) is initialized as a centroid.

At step 1310, the shortest path variable is initially set to a value equal to the $L_2$ norm distance between the points. This shortest conduction path value will be iteratively refined through the remainder of steps shown in FIG. 13, but the process uses the $L_2$ norm as a rough first guess with which to start. In mathematics, a norm is a function of a real or complex vector space to the nonnegative real numbers that behaves in certain ways, like the distance from the origin. The norm commutes with scaling, obeys a form of the triangle inequality, and is zero only at the origin. The $L_2$ norm is the Euclidean norm, and is a Euclidean distance of a vector from the origin. The $L_2$ norm may be defined as the square root of the inner product of a vector with itself.

At step 1312, a determination is made whether a recalculated path is shorter. Note that, for the first path calculated, the result of step 1312 is always "yes." In other words, because the first path is the only initial path, and there is no other path to compare the initial path, the intervening steps from step 1314 to step 1326 will be performed on the first pass of the loop formed by step 1312 through step 1326.

At step 1314, the shortest path found so far is projected onto the surface A (1302). Then, at step 1316, the point on surface A (1302) is reassigned as a projected point from the last step. At step 1318, the shortest path found so far is projected onto the surface B (1304). Then, at step 1320, the point on surface B (1304) is reassigned as a projected point from the last step.

At step 1322, a $L_1$ norm path is calculated between the points on the surface A (1302) and the surface B (1304). The $L_1$ norm is a norm, as defined generally for the $L_2$ norm. However, the $L_1$ norm is different. The $L_1$ norm is sometimes referred to as the Manhattan norm. The name relates to the distance a taxi has to drive in a rectangular street grid to get from the origin to the point "x". The set of vectors whose 1-norm is a given constant forms the surface of a cross polytope of dimension equivalent to that of the norm minus 1. The distance derived from the $L_1$ norm is the sum of the absolute values of the columns, and can be expressed as:

$$\|x\|_1 := \Sigma_{i=1}^{n} |x_i|$$

At step 1324, the shortest path components are projected onto the closest film surfaces to the surface A (1302) and the surface B (1304). At step 1326, the shortest path is reassigned as the recomputed segments from the last step. The process then returns to step 1312 and repeats.

The loop represented by step 1312 through step 1326 continues until convergence. Convergence occurs when the recalculated path is no longer shorter (a "no" determination at step 1312). The output (1328) of the method is thus the shortest path of conduction between the surface A (1302) and the surface B (1304). At this point, the method of FIG. 13 terminates.

Variants are possible. In the embodiment of FIG. 13, the Euclidean length (the $L_2$-norm) could be used to compute an approximate distance, but this technique is generally not accurate. The Manhattan ($L_1$-norm) is more accurate, but even then, the norm could be computed outside the bounds of the film itself, which may not be likely. Instead, the one or more embodiments use a nontrivial custom norm evaluation to calculate the path of connection. The one or more embodiments also ensure that the path is available through the available film thickness. The method (1300) is the nontrivial custom norm evaluation.

Here, an iterative approach is used to calculate a series of $L_2$-norm values projected onto the film surfaces, until a shortest conduction path connecting through the available film is determined. The shortest path is the most likely path for electric conduction in a galvanic corrosion type of material change.

Attention is now turned to FIG. 14 through FIG. 19, which should be considered together. FIG. 14 through FIG. 19 represents a specific example of generating a model of a film, as described with respect to FIG. 11 through FIG. 13, for an actual complex object subject to a material change process over time. Reference numerals common to FIG. 14 through FIG. 19 refer to the same objects.

Figure 14:
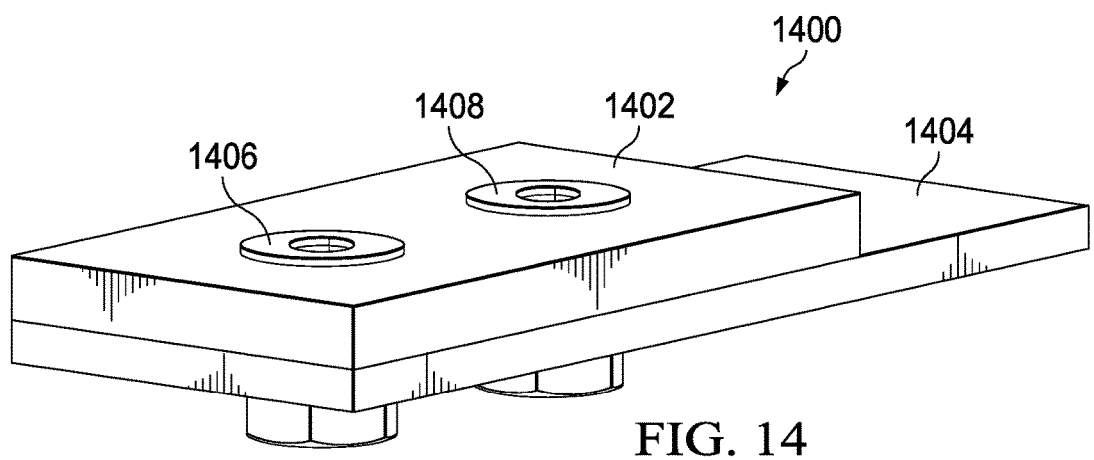
FIG. 14 shows an object subject to a material change rate over time, in accordance with one or more embodiments.

In particular, FIG. 14 shows an object subject to a material change rate over time, in accordance with one or more embodiments. FIG. 14 shows a complex object (1400). The complex object (1400) includes two plates, plate A (1402) joined to plate B (1404). In the one or more embodiments of FIG. 14, the plate A (1402) was made from a composite fiber reinforced polymer (CFRP), and the plate B (1404) was made from aluminum. The plate A (1402) (the CFRP block) was masked to prevent it from interacting with the film.

The plate A (1402) and the plate B (1404) are joined by two fasteners, first fastener (1406), and second fastener (1408). The first fastener (1406) and the second fastener (1408) are made out a different metal, titanium in this example.

The complex object (1400) is subject to material change over time due to environmental conditions. In this specific example, the components of the complex object (1400) are metal. Thus, the complex object (1400) is subject to galvanic corrosion, which is a specific example of a material change process.

Figure 15:
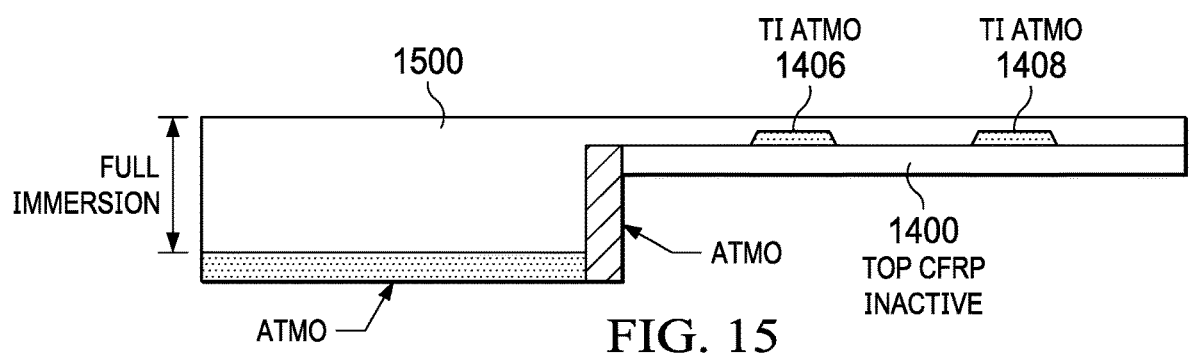
FIG. 15 shows a diagram of the object of FIG. 14 immersed in a thick film for testing galvanic coupling, in accordance with one or more embodiments.

FIG. 15 shows a diagram of the complex object (1400) of FIG. 14 immersed in a thick film for testing galvanic coupling, in accordance with one or more embodiments. In the example of FIG. 14, the complex object (1400) is immersed in a thin film (1500). The thin film (1500) in this example is water. Thus, it is expected that electrical conduction paths between the titanium fasteners and the aluminum plates may become available depending on the thickness of the parts. Corrosion (galvanically induced material change) takes place such that the shortest of these electrical paths experience the greatest material change rate.

Figure 16:
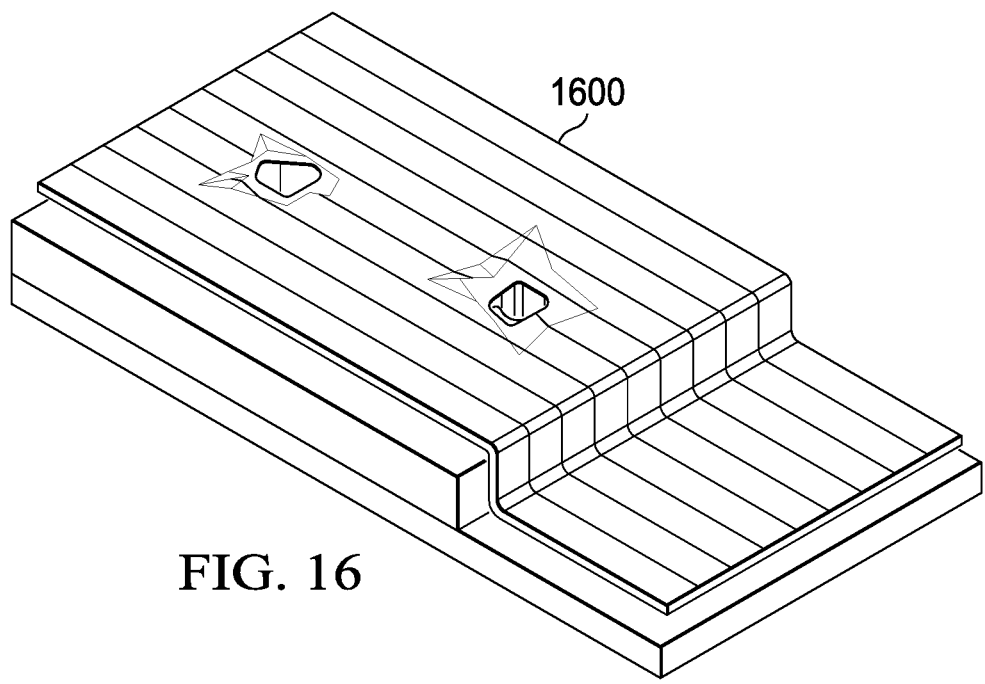
FIG. 16 and FIG. 17 show two examples of fluid film model surfaces generated using different thicknesses and properties, in accordance with one or more embodiments.
Figure 17:
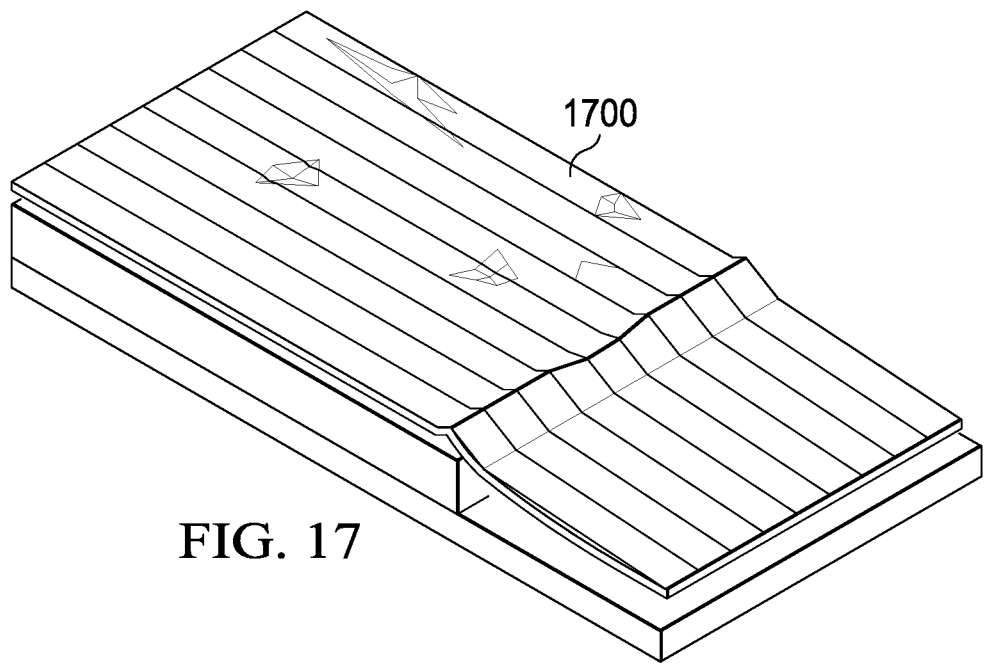

Attention is now turned to FIG. 16 and FIG. 17. FIG. 16 and FIG. 17 show two examples of fluid film model surfaces generated using different thicknesses and properties, in accordance with one or more embodiments. The first film (1600) (FIG. 16) and the second film (1700) (FIG. 17) are model films used to estimate electrical path distances. Specifically, the first film (1600) and the second film (1700) are fluid film model surfaces generated using different thicknesses and properties. The first film (1600) and the second film (1700) are generated using the techniques described with respect to FIG. 12.

In FIG. 16 and FIG. 17, visualizations of the film model surfaces generated are shown for different thicknesses and models. Different thicknesses, properties and different directions of gravitational acceleration (or inclusion of additional body forces acting on the film) can be used to specify the film development without having to compute the entire flow field within the film.

Figure 18:
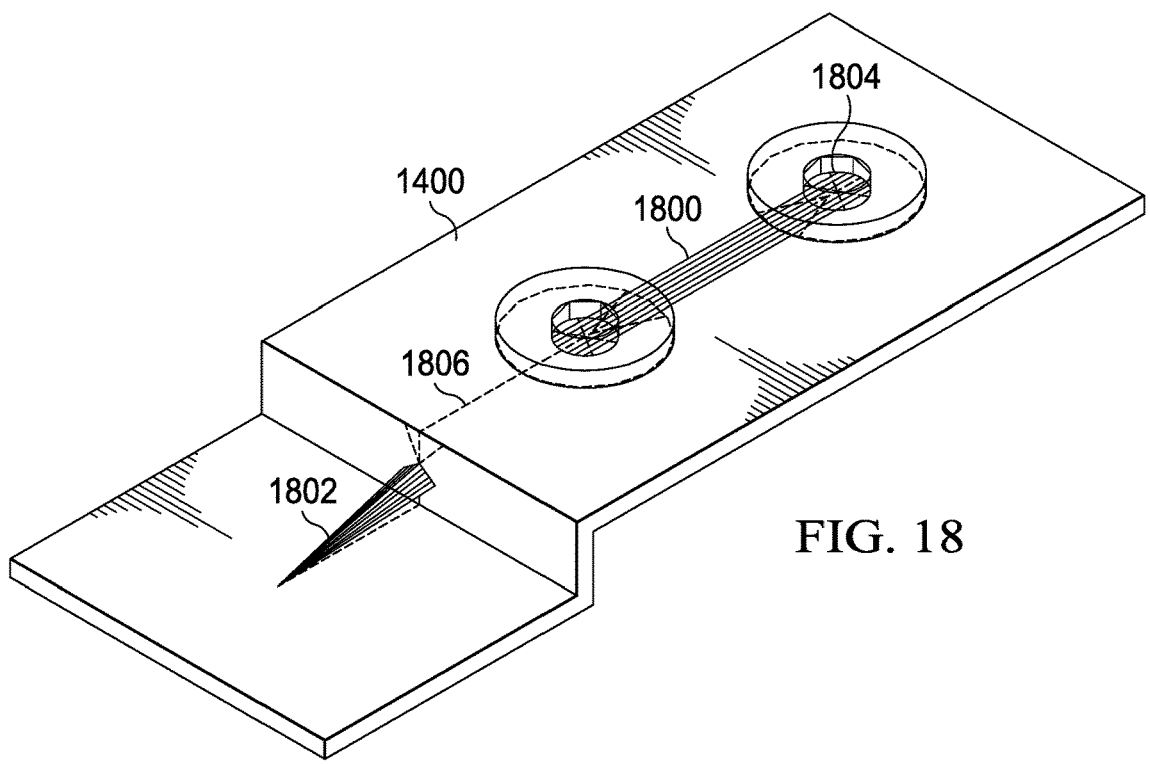
FIG. 18 shows an example of electrical pathways calculated for the models generated in FIG. 16 and FIG. 17, in accordance with one or more embodiments.
Figure 19:
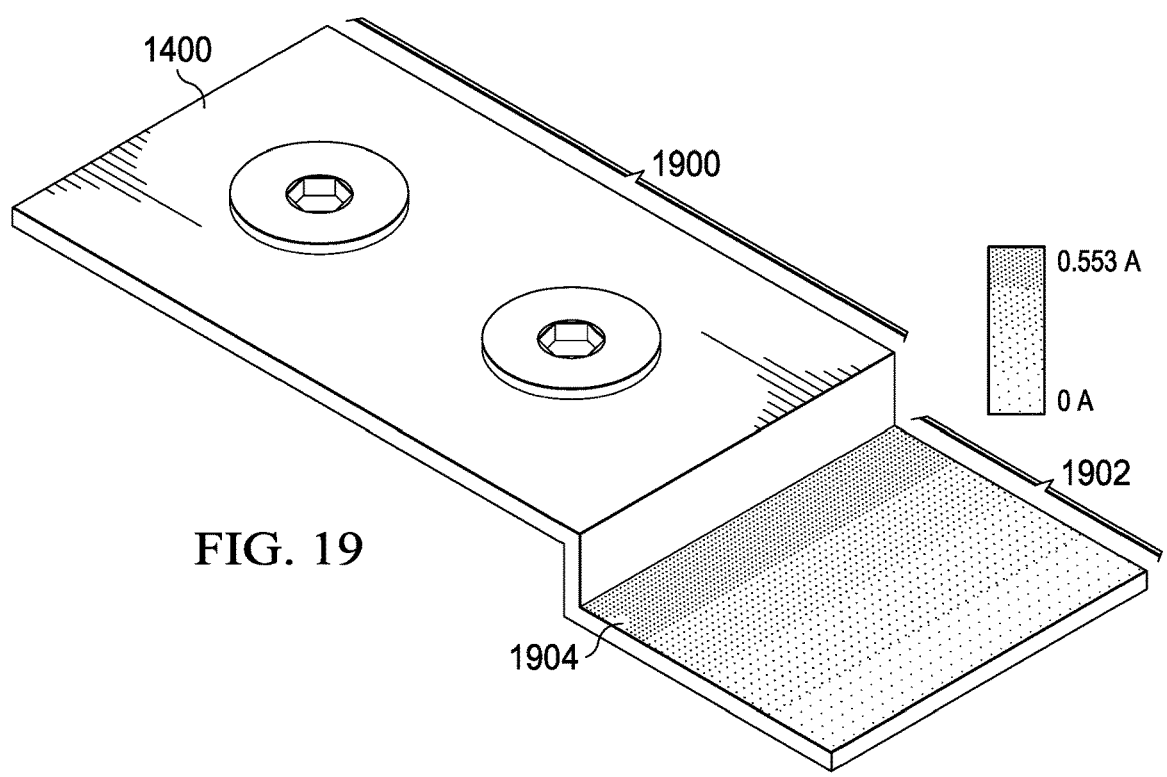
FIG. 19 shows results of galvanic material change rates for surfaces in the model generated in FIG. 16 and FIG. 17, in accordance with one or more embodiments.

Attention is now turned to FIG. 18 and FIG. 19. FIG. 18 shows an example of electrical pathways calculated for the models generated in FIG. 16 and FIG. 17, in accordance with one or more embodiments. FIG. 19 shows results of galvanic material change rates for surfaces in the model generated in FIG. 16 and FIG. 17, in accordance with one or more embodiments.

In FIG. 18, a first line (1800) and a second line (1802) are Euclidean ($L_2$-norm) lines from each centroid to each other centroid of each part connected through the film (the first film (1600) or the second film (1700)) shown for comparison purposes. The Euclidean distances are unrealistic and cannot be used, as they underestimate the conduction path length and potentially provide connections between materials that are not connected through the film (the first film (1600) or the second film (1700)).

However, the custom $L_1$-norm conduction path calculation using the procedure shown in FIG. 13 can resolve a good approximation to this distance quickly and without having to solve an entire first-principles model. These paths are shown in dotted lines in FIG. 18, such as third line (1804) and fourth line (1806).

Finally, the resulting corrosion rates predicted for the material contacts found connected through the film are shown in FIG. 19. Here, the top of the complex object (1400) was masked and so did not couple to the film. The masked area is indicated by brackets (1900).

The lower edge of the complex object (1400), represented by brackets (1902), was discretized into separate strips to allow the whole area of the step to be resolved. The results show that the fasteners (i.e., the first fastener (1406) and the second fastener (1408)) suffered small corrosion rates. However, the area represented by the brackets (1902), suffered large corrosion rates. Corrosion rates were highest near the closest edge (1904), due to a smaller conduction length. The corrosion patterns shown in FIG. 19 occurred through the film between the fasteners and the metal plates. Note that, without the film, these surfaces would not have had contact to interact and thus corrosion would not have occurred. Thus, the film modeling technique described herein may be used to predict hidden corrosion or other material change patterns that otherwise could not be easily predicted.

The modeling performed on the complex object (1400) shown in FIG. 14 through FIG. 19 was tested by using a real complex object of the same dimensions and materials. The expected corrosion patterns occurred, as predicted by the model, within an acceptable degree of error.

Figure 20A:
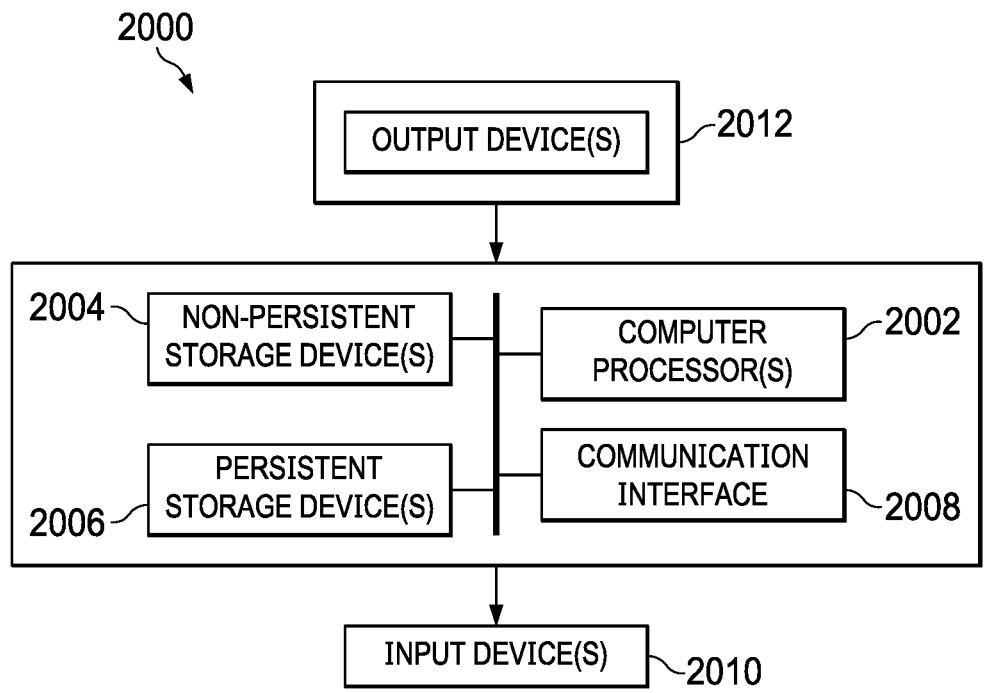
FIG. 20A and FIG. 20B show a computing system in a network environment, in accordance with one or more embodiments.
Figure 20B:
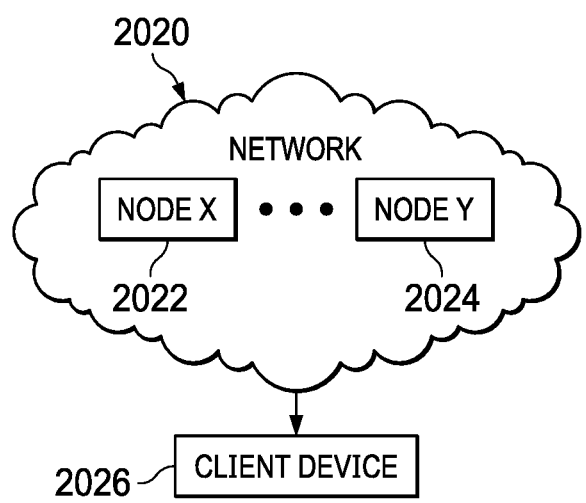

FIG. 20A and FIG. 20B are examples of a computing system and a network, in accordance with one or more embodiments. The one or more embodiments described with respect to FIG. 1A through FIG. 19 may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 20A, the computing system (2000) may include one or more computer processor(s) (2002), non-persistent storage device(s) (2004) (e.g., volatile memory, such as random access memory (RAM), cache memory), persistent storage device(s) (2006) (e.g., a hard disk, an optical drive such as a compact disk (CD) drive or digital versatile disk (DVD) drive, a flash memory, etc.), a communication interface (2008) (e.g., Bluetooth interface, infrared interface, network interface, optical interface, etc.), and numerous other elements and functionalities that implement the features and elements of the disclosure.

The computer processor(s) (2002) may be an integrated circuit for processing instructions. For example, the computer processor(s) may be one or more cores or micro-cores of a processor. The computing system (2000) may also include one or more input devices (2010), such as a touchscreen, keyboard, mouse, microphone, touchpad, electronic pen, or any other type of input device.

The communication interface (2008) may include an integrated circuit for connecting the computing system (2000) to a network (not shown) (e.g., a local area network (LAN), a wide area network (WAN) such as the Internet, mobile network, or any other type of network) and/or to another device, such as another computing device.

Further, the computing system (2000) may include one or more output devices (2012), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (2002), non-persistent storage device(s) (2004), and persistent storage device(s) (2006). Many different types of computing systems exist, and the aforementioned input and output device(s) may take other forms.

Software instructions in the form of computer readable program code to perform the one or more embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

The computing system (2000) in FIG. 20A may be connected to or be a part of a network. For example, as shown in FIG. 20B, the network (2020) may include multiple nodes (e.g., node X (2022), node Y (2024)). Each node may correspond to a computing system, such as the computing system shown in FIG. 20A, or a group of nodes combined may correspond to the computing system shown in FIG. 20A. By way of an example, the one or more embodiments may be implemented on a node of a distributed system that is connected to other nodes. By way of another example, the one or more embodiments may be implemented on a distributed computing system having multiple nodes, where each portion of the one or more embodiments may be located on a different node within the distributed computing system. Further, one or more elements of the aforementioned computing system (2000) may be located at a remote location and connected to the other elements over a network.

Although not shown in FIG. 20B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (2022), node Y (2024)) in the network (2020) may be configured to provide services for a client device (2026). For example, the nodes may be part of a cloud computing system. The nodes may include functionality to receive requests from the client device (2026) and transmit responses to the client device (2026). The client device (2026) may be a computing system, such as the computing system shown in FIG. 20A. Further, the client device (2026) may include and/or perform all or a portion of one or more embodiments of the one or more embodiments.

The computing system or group of computing systems described in FIG. 20A and FIG. 20B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the one or more embodiments. The processes may be part of the same or different application and may execute on the same or different computing system.

Rather than or in addition to sharing data between processes, the computing system performing the one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing the one or more embodiments, may extract one or more data items from the obtained data. For example, the extraction may be performed as follows by the computing system in FIG. 20A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 20A, while performing the one or more embodiments of, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 20A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 20A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 20A and the nodes and/or client device in FIG. 20B. Other functions may be performed using the one or more embodiments.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A method comprising:
receiving environmental data describing a first plurality of physical parameters of an environment in which an object is located, wherein the object comprises a first material and a second material that galvanically or chemically interacts with the first material;
receiving sensor data describing a second plurality of physical parameters of the object;
receiving a multi-state model of the object, wherein the multi-state model comprises a plurality of distinct galvanic or chemical states of the object, and wherein each of the plurality of distinct galvanic or chemical states represents a corresponding different equation applicable to a corresponding specific galvanic or chemical interaction between the first material and the second material;
performing a stochastic optimization operation on the multi-state model until convergence on a plurality of candidate sets of galvanic or chemical material change rates for the plurality of distinct galvanic or chemical states of the object, wherein averaging is used to alleviate a plurality of variables from the multi-state model to thereby increase a speed of performing the stochastic optimization operation, and wherein performing the stochastic optimization operation is performed by dispatching multiple single-objective optimization runs of the plurality of distinct galvanic or chemical states of the object to concurrently minimize different determinations of error for the plurality of distinct galvanic or chemical states, and further wherein dispatching is performed according to one of: random dispatching, a lattice hypercube algorithm, or an orthogonal array algorithm;
generating a correlation model for a surrogate parameter for the second plurality of physical parameters by correlating the environmental data to the sensor data using the plurality of candidate sets of galvanic or chemical material change rates;
generating an aircraft design using the correlation model; and
building an aircraft according to the aircraft design.

2. The method of claim 1, further comprising:
applying, as part of performing the stochastic optimization operation, a plurality of maximum error bounds to each of the plurality of distinct galvanic or chemical states of the object.

3. The method of claim 2, wherein performing the stochastic optimization operation comprises applying a plurality of constraints to the multi-state model.

4. The method of claim 3, wherein the plurality of constraints are selected from the group consisting of: an absolute error of a corresponding material change rate for a corresponding selected state in the multi-state model, an absolute error of a cumulative material change for the corresponding selected state in the multi-state model, a square error of a material change rate for the corresponding selected state in the multi-state model, a square error of the corresponding material change rate for the corresponding selected state in the multi-state model, a spectral error metric for the corresponding material change rate for the corresponding selected state in the multi-state model, a periodic error metric for the corresponding material change rate for the corresponding selected state in the multi-state model, and combinations thereof.

5. The method of claim 1, further comprising:
selecting a galvanic or chemical material change rate for the object from the plurality of candidate sets of galvanic or chemical change rates using the correlation model; and
reporting the galvanic or chemical material change rate.

6. The method of claim 1, wherein:
the environmental data is selected from a first group of measurements over time, the first group of measurements consisting of at least one of: relative humidity, absolute humidity, temperature, pressure, precipitation, wind speed, wind direction, dew point, salt content, and chloride mass deposition; and
the sensor data is selected from a second group of measurements over time, the second group of measurements consisting of at least one of: solution resistance, polarization resistance, chemical measurements, and dimensional measurements.

7. A method, comprising:
receiving a correlation model, wherein the correlation model is generated by: receiving environmental data describing a first plurality of physical parameters of an environment in which an object is located, wherein the object comprises a first material and a second material that galvanically or chemically interacts with the first material;
receiving sensor data describing a second plurality of physical parameters of the object;
receiving a multi-state model of the object, wherein the multi-state model comprises a plurality of distinct galvanic or chemical states of the object, and wherein each of the plurality of distinct galvanic or chemical states represents a corresponding different equation applicable to a corresponding specific galvanic or chemical interaction between the first material and the second material;
performing a stochastic optimization operation on the multi-state model until convergence on a plurality of candidate sets of galvanic or chemical material change rates for the plurality of distinct galvanic or chemical states of the object, wherein performing the stochastic optimization operation is performed by dispatching multiple single-objective optimization runs of the plurality of distinct galvanic or chemical states of the object to concurrently minimize different determinations of error for the plurality of distinct galvanic or chemical states, and further wherein dispatching is performed according to one of: random dispatching, a lattice hypercube algorithm, or an orthogonal array algorithm;
generating the correlation model for a surrogate parameter for the second plurality of physical parameters by correlating the environmental data to the sensor data using the plurality of candidate sets of galvanic or chemical material change rates, wherein averaging is used to alleviate a plurality of variables from the multi-state model to thereby increase a speed of performing the stochastic optimization operation;
selecting a galvanic or chemical material change rate for the object from the plurality of candidate sets of galvanic or chemical change rates using the correlation model;
generating an aircraft design using the correlation model, wherein generating the aircraft design comprises designing an aircraft with one or more parts to reduce the selected galvanic or chemical material change rate; and building an aircraft according to the aircraft design.

8. The method of claim 7, wherein selecting the galvanic or chemical material change rate for the object comprises:
receiving updated environmental data regarding the object;
using the correlation model by applying, as input, the updated environmental data to the correlation model and mapping the updated environmental data to a correlated surrogate quantity to evaluate a wetness of the object over time; and
selecting a selected state and a corresponding galvanic or chemical material change rate for the object based on the wetness of the object.

9. The method of claim 8, further comprising:
estimating, using the selected state and the corresponding galvanic or chemical material change rate for the object, an accumulated galvanic or chemical material change in the object over a pre-selected time.

10. The method of claim 9, further comprising:
generating a maintenance plan for the object over the pre-selected time based on the accumulated galvanic or chemical material change; and
implementing the maintenance plan.

11. The method of claim 9, further comprising:
generating an updated design by changing a design parameter of the object based on the accumulated galvanic or chemical material change; and
manufacturing the object using the updated design.

12. The method of claim 7, wherein the action comprises:
generating a maintenance plan for the object over a pre-selected time based on the galvanic or chemical material change rate; and
implementing the maintenance plan.

13. The method of claim 7, wherein the action comprises:
generating a changed design parameter by changing a design parameter of the object based on the galvanic or chemical material change rate; and
manufacturing the object using the changed design parameter.

14. A method of improving a computer-generated model of a galvanic or chemical material change rate for an object comprising a first material and a second material that is capable of galvanic or chemical interaction with the first material, the method comprising:
generating a surface construction of a film of wetness on the object; determining a path of electrical conduction between the first material and the second material, wherein
determining the path comprises using a projected norm process that resolves a representation of the path;
inputting the path into a multi-state model of the object, wherein the multi-state model comprises a plurality of distinct galvanic or chemical states of the object, and wherein each of the plurality of distinct galvanic or chemical states represents a corresponding different equation applicable to a corresponding specific galvanic or chemical interaction between the first material and the second material, wherein a stochastic optimization operation is performed on the multi-state model until convergence on a plurality of candidate sets of galvanic material change rates for the plurality of distinct galvanic or chemical states of the object, wherein averaging is used to alleviate a plurality of variables from the multi-state model, and wherein performing the stochastic optimization operation is performed by dispatching multiple single-objective optimization runs of the plurality of distinct galvanic or chemical states of the object to concurrently minimize different determinations of error for the plurality of distinct galvanic or chemical states, and further wherein dispatching is performed according to one of: random dispatching, a lattice hypercube algorithm, or an orthogonal array algorithm;
generating a correlation model using the plurality of candidate sets of galvanic or chemical material change rates;
selecting a galvanic or chemical material change rate for the object from the plurality of candidate sets of galvanic or chemical change rates using the correlation model;
generating an aircraft design using the correlation model, wherein generating the aircraft design comprises designing an aircraft with one or more parts to reduce the selected galvanic or chemical material change rate; and
building an aircraft according to the aircraft design.

15. The method of claim 14, wherein generating the surface construction of the film of wetness comprises:
generating film geometric surfaces based on a thickness of the film and a direction of gravity relative to a selected orientation of the object.

16. The method of claim 14, wherein determining the path of electrical conduction comprises:
building an adjacency tree from the surface construction of the film of wetness; and
determining a plurality of surfaces of the object that are connected to each other through a bulk volume of the film.

17. The method of claim 16, further comprising:
for each pair of dissimilar material contacts found among the plurality of surfaces of the object that are connected through the film, determining a plurality of corresponding conduction paths; and
wherein the path of electrical conduction between the first material and the second material comprises the plurality of corresponding conduction paths.

18. A method of generating a computer-generated model of galvanic or chemical interaction in an object comprising a first material and a second material that is capable of galvanic or chemical interaction with the first material, the method comprising:
receiving a plurality of parameters describing a plurality of physical parameters of the object;
generating a plurality of modeled geometric surfaces of the object based on a model geometry of the object, a modeled thickness of a film disposed over surfaces of the object, and a direction of gravity relative to a selected orientation of the object;
generating connectivity information between sub-parts of the object that are electrically coupled via the film, wherein the connectivity information comprises points of contact between the first material and the second material;
generating a film model by generating a plurality of electrical conduction paths for each of the points of contact and determining corresponding distances of the plurality of electrical conduction paths;
inputting the film model into a multi-state model of the object, wherein the multi-state model comprises a plurality of distinct states of the object, wherein a stochastic optimization operation is performed on the multi-state model until convergence on a plurality of candidate sets of galvanic or chemical material change rates for the plurality of distinct galvanic or chemical states of the object, wherein averaging is used to alleviate a plurality of variables from the multi-state model, and wherein performing the stochastic optimization operation is performed by dispatching multiple single-objective optimization runs of the plurality of distinct galvanic or chemical states of the object to concurrently minimize different determinations of error for the plurality of distinct galvanic or chemical states, and further wherein dispatching is performed according to one of: random dispatching, a lattice hypercube algorithm, or an orthogonal array algorithm;

generating a correlation model using the plurality of candidate sets of galvanic or chemical material change rates;

selecting a galvanic or chemical material change rate for the object from the plurality of candidate sets of galvanic or chemical change rates using the correlation model;

generating an aircraft design using the correlation model, wherein generating the aircraft design comprises designing an aircraft with one or more parts to reduce the selected galvanic or chemical material change rate; and building an aircraft according to the aircraft design.

19. The method of claim 18, wherein the plurality of physical parameters are selected from the group consisting of: a thickness of the object, thicknesses of different sub-components of the object, a material property of the object, material properties of different sub-components of the object, a material property of the film, and combinations thereof.

20. The method of claim 18, wherein the object comprises an aircraft, and wherein the first material and the second material are indirectly connected to each other via the film.

21. The method of claim 18, further comprising:
using the film model to estimate a galvanic or chemical material change in the object over time; and
modifying the object based on the galvanic or chemical material change in the object over time.

22. The method of claim 1, wherein the object is an aircraft.

23. The method of claim 18, wherein the object is an aircraft.

24. The method of claim 22, wherein the first material and the second material are included in different galvanically or chemically linked parts of the aircraft.

25. The method of claim 23, wherein the first material and the second material are included in different galvanically or chemically linked parts of the aircraft.

* * * * *